(12) United States Patent
Sudry et al.

(10) Patent No.: US 12,505,575 B2
(45) Date of Patent: Dec. 23, 2025

(54) DETERMINING POSITION OF AN IMAGE CAPTURE DEVICE

(71) Applicant: Buildots Ltd., Tel Aviv (IL)

(72) Inventors: Yakir Sudry, Ramat Gan (IL); Roy Danon, Tel Aviv (IL)

(73) Assignee: Buildots Ltd., Tel-Aviv (IL)

( * ) Notice: Subject to any disclaimer, the term of this patent is extended or adjusted under 35 U.S.C. 154(b) by 415 days.

(21) Appl. No.: 17/601,225

(22) PCT Filed: Apr. 2, 2020

(86) PCT No.: PCT/IL2020/050406
§ 371 (c)(1),
(2) Date: Oct. 4, 2021

(87) PCT Pub. No.: WO2020/202163
PCT Pub. Date: Oct. 8, 2020

(65) Prior Publication Data
US 2022/0198709 A1    Jun. 23, 2022

Related U.S. Application Data

(60) Provisional application No. 62/827,877, filed on Apr. 2, 2019, provisional application No. 62/827,964, filed
(Continued)

(51) Int. Cl.
*G06T 7/73* (2017.01)
*G06F 30/12* (2020.01)
(Continued)

(52) U.S. Cl.
CPC ............... *G06T 7/75* (2017.01); *G06F 30/12* (2020.01); *G06F 30/13* (2020.01);
(Continued)

(58) Field of Classification Search
CPC . G06T 7/75; G06T 2207/20084; G06T 15/00; G06T 2207/30244; G06Q 50/08; G06F 30/13
See application file for complete search history.

(56) References Cited

U.S. PATENT DOCUMENTS 5,918,219 A     6/1999  Isherwood
10,347,008 B2 *  7/2019  Kahle ..................... G06T 7/344
(Continued)

FOREIGN PATENT DOCUMENTS

| WO | 2013040682    | 3/2013  |
| WO | WO 2020/202163 | 10/2020 |
| WO | WO 2020/202164 | 10/2020 |

OTHER PUBLICATIONS

Christopher Kropp, Interior construction state recognition with 4D registered image sequences, Automation in Construction, vol. 86, pp. 11-32 (Year: 2018).*
(Continued)

*Primary Examiner* — Matthew C Bella
*Assistant Examiner* — Janice E. Vaz

(57) ABSTRACT

A method for determining a position of an image capture device (ICD) within a building site, the module comprising: registering an image captured in the building site by the ICD; registering an initial ICD position of the ICD at the time the image was captured; generating a plurality of proposed ICD positions based on the initial ICD position; and selecting an optimized ICD position from the plurality of proposed ICD positions. Optionally, the optimized ICD position is selected responsive to a model of the building site that comprises sufficient information to generate a three dimensional (3D) representation of the building site.

17 Claims, 14 Drawing Sheets

Related U.S. Application Data on Apr. 2, 2019, provisional application No. 62/827,878, filed on Apr. 2, 2019, provisional application No. 62/827,956, filed on Apr. 2, 2019.

(51) Int. Cl.

| | |
|---|---|
| *G06F 30/13* | (2020.01) |
| *G06Q 10/0631* | (2023.01) |
| *G06Q 50/08* | (2012.01) |
| *G06T 7/00* | (2017.01) |
| *G06T 15/00* | (2011.01) |
| *G06V 10/70* | (2022.01) |

(52) U.S. Cl.
CPC ..... *G06Q 10/063114* (2013.01); *G06Q 50/08* (2013.01); *G06T 7/0006* (2013.01); *G06T 7/0008* (2013.01); *G06T 7/001* (2013.01); *G06T 15/00* (2013.01); *G06V 10/87* (2022.01); *G06T 2207/20084* (2013.01); *G06T 2207/30132* (2013.01); *G06T 2207/30244* (2013.01)

(56) References Cited

U.S. PATENT DOCUMENTS

| | | | |
|---|---|---|---|
| 10,467,758 | B1 | 11/2019 | Lorenzo |
| 2001/0043738 | A1* | 11/2001 | Sawhney ............... G06T 15/20 382/154 |
| 2008/0015823 | A1 | 1/2008 | Arnold et al. |
| 2009/0174768 | A1 | 7/2009 | Blackburn et al. |
| 2010/0241403 | A1 | 9/2010 | Jakobsen et al. |
| 2012/0016638 | A1 | 1/2012 | McLean et al. |
| 2012/0194644 | A1* | 8/2012 | Newcombe ............... G06T 7/20 348/46 |
| 2013/0155058 | A1 | 6/2013 | Golparvar-Fard et al. |
| 2013/0191093 | A1 | 7/2013 | Leitch et al. |
| 2013/0338971 | A1 | 12/2013 | Chao et al. |
| 2013/0338972 | A1 | 12/2013 | Chao et al. |
| 2014/0229212 | A1 | 8/2014 | MacElheron et al. |
| 2015/0009206 | A1 | 1/2015 | Arendash et al. |
| 2015/0310135 | A1 | 10/2015 | Forsyth et al. |
| 2017/0098309 | A1* | 4/2017 | Michel ............... H04N 13/282 |
| 2017/0358048 | A1 | 12/2017 | Kotake et al. |
| 2018/0012125 | A1 | 1/2018 | Ladha et al. |
| 2018/0349522 | A1 | 12/2018 | Aphek et al. |
| 2019/0080467 | A1* | 3/2019 | Hirzer ............... G06T 7/73 |
| 2019/0180433 | A1 | 6/2019 | Sasson et al. |
| 2019/0236516 | A1 | 8/2019 | Ponnusamy |
| 2020/0013188 | A1* | 1/2020 | Nakashima ............ G06N 3/045 |
| 2020/0057778 | A1* | 2/2020 | Sun ..................... G06N 3/04 |
| 2020/0134745 | A1 | 4/2020 | McLinden et al. |
| 2022/0207458 | A1 | 6/2022 | Sudry et al. |

OTHER PUBLICATIONS

X. Li and Y. Zhang, "Digital image edge detection based on LVQ neural network," 2016 IEEE 11th Conference on Industrial Electronics and Applications (ICIEA), Hefei, China, 2016, pp. 1251-1255, doi: 10.1109/ICIEA.2016.7603776 (Year: 2016).*
Christopher Kropp, Interior construction state recognition with 4D registered image sequences, Automation in Construction, 2018, vol. 86, pp. 11-32 (Year: 2018).*
C. A. Ochotorena "Gradient-guided filtering of depth maps using deep neural networks," 2015 International Conference on Humanoid, Nanotechnology, Information Technology, Communication and Control, Environment and Management (HNICEM), Cebu, Philippines, 2015, pp. 1-8, doi: 10.1109/HNICEM.2015.7393265 (Year: 2015).*
International Search Report and Written Opinion dated Aug. 12, 2020 for Application No. PCT/IL2020/050406 filed Apr. 2, 2020.
International Preliminary Report on Patentability dated May 27, 2021 or Application No. PCT/IL2020/050406 filed Apr. 2, 2020.
Christopher Kropp, Interior construction state recognition with 4D registered image sequenses, Automation in Construction, Sep. 15, 2020, pp. 14-22 and 24-29.
International Search Report and Written Opinion dated Oct. 6, 2020 for Application No. PCT/IL2020/050407 filed Apr. 2, 2020.
International Preliminary Report on Patentability dated Aug. 4, 2021 for Application No. PCT/IL2020/050407 filed Apr. 2, 2020.
Extended Search Report dated Apr. 22, 2022 for European Application No. 20784934.0, filed Oct. 14, 2021.
Extended Search Report dated Apr. 22, 2022 for European Application No. 20782640.5, filed Oct. 14, 2021.
Canadaian Office Action dated Dec. 6, 2022 for Canadaia Application 3,136,055, filed Oct. 4, 2021.
Official Action Dated May 8, 2024 From the US Patent and Trademark Office Re. U.S. Appl. No. 17/601,095. (30 Pages).
Communication Pursuant to Article 94(3) EPC Dated Aug. 7, 2023 From the European Patent Office Re. Application No. 20784934.0 (7 Pages).
Communication Pursuant to Article 94(3) EPC Dated Jan. 12, 2024 From the European Patent Office Re. Application No. 20784934.0 (4 Pages).
Communication Pursuant to Article 94(3) EPC Dated Feb. 14, 2023 From the European Patent Office Re. Application No. 20784934.0 (6 Pages).
International Preliminary Report on Patentability Dated Jul. 22, 2021 From the International Preliminary Examining Authority Re. Application No. PCT/IL2020/050407. (29 Pages).
Official Action Dated Oct. 5, 2023 From the US Patent and Trademark Office Re. U.S. Appl. No. 17/601,095. (26 Pages).
Official Action Dated Dec. 4, 2024 From the US Patent and Trademark Office Re. U.S. Appl. No. 17/601,095. (26 Pages).
Interview Summary Dated Oct. 10, 2024 From the US Patent and Trademark Office Re. U.S. Appl. No. 17/601,095. (11 Pages).
Communication Pursuant to Article 94(3) EPC Dated Jun. 28, 2024 From the European Patent Office Re. Application No. 20782640.5. (5 Pages).

* cited by examiner

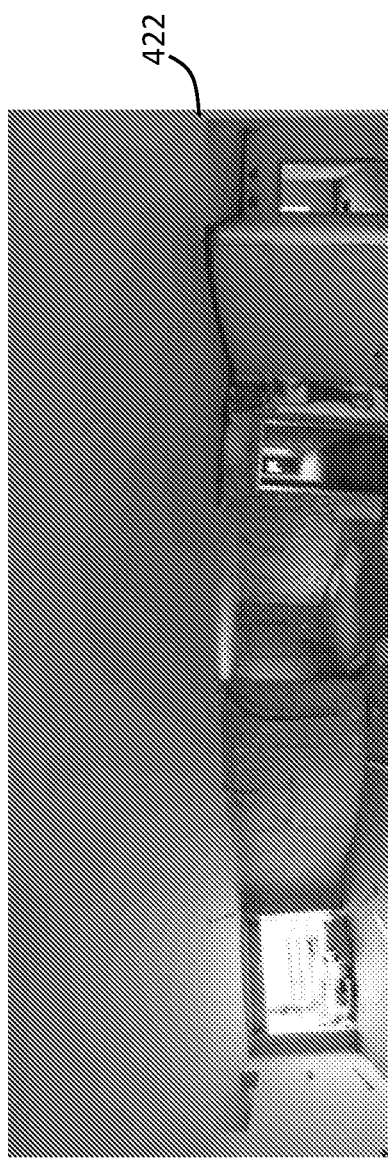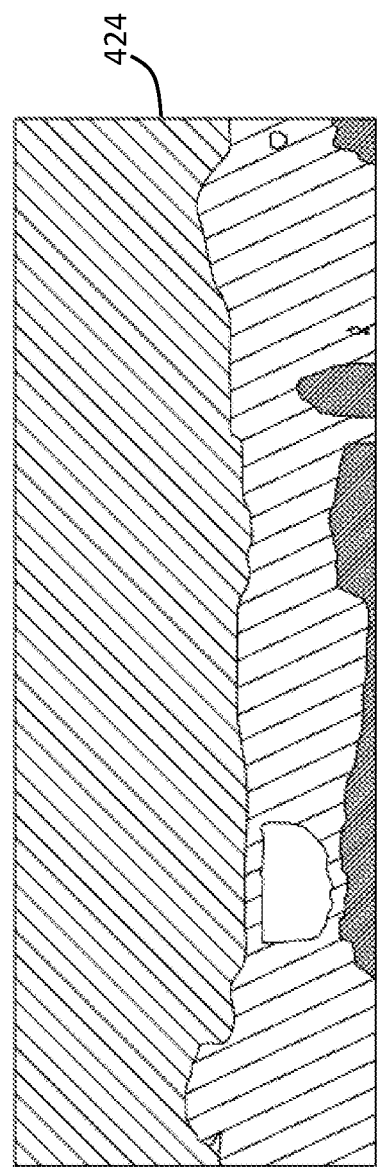
FIG. 5A
FIG. 5B

Data Driven Construction Management Software – Project Overview 600

Days since started: 20 June 2018
Expected Delivery Date: 30 November 2019 (original: 25 August 2019)   602

Project Status   604

| Area / Activity | Superstructure | Brick-laying | Flooring | Windows | ... | ... |
|---|---|---|---|---|---|---|
| Apartment 1 | completed | completed (w/ Delay) | completed | Completed (w/ Delay) | completed | completed |
| Apartment 2 | completed | Completed (w/ Delay) | completed | Not ready | Not ready | Not ready |
| Apartment 3 | completed | completed | completed | Not ready | Not ready | Not ready |
| Apartment 4 | ready | Not ready | Not ready | Not ready | Not ready | Not ready |
| Apartment 5 | Not ready | Not ready | Not ready | Not ready | Not ready | Not ready |
| Lobby | completed | Completed (w/ Delay) | Completed (w/ Delay) | Completed | completed | completed |
| Basement | completed | Completed (w/ Delay) | completed | N/A | completed | completed |

Insights   606

Brick-laying is the most common reason for delays in the project

You have 21 electricity layout issues to review

The projected delivery date is 30 November 2019, which is 97 days past original schedule

Fig. 12

DETERMINING POSITION OF AN IMAGE CAPTURE DEVICE

RELATED APPLICATIONS

The present application is a US National Phase of PCT Application No. PCT/IL2020/050406 filed on Apr. 2, 2020, which claims the benefit under 35 U.S.C. 119(e) of U.S. Provisional Application 62/827,877 filed on Apr. 2, 2019, U.S. Provisional Application 62/827,878 filed on Apr. 2, 2019, U.S. Provisional Application 62/827,956 filed on Apr. 2, 2019 and U.S. Provisional Application 62/827,964 filed on Apr. 2, 2019, the disclosures of which are incorporated herein by reference.

BACKGROUND

A building project is a project for building a building or a portion thereof. A building project requires the performance of a wide variety of building tasks to assemble and install a wide variety of building parts, by way of example a foundation, a plinth, walls, columns, floors, roof, doors, windows, stairs, electrical wiring, and plumbing. Each building can comprise many components and sub-components, which have to be assembled through performance of many tasks.

Typically, a building project is performed in accordance with an architectural model and design specifications, including specifications for, by way of example, electrical wiring, air conditioning, kitchen appliances, and plumbing, that represent the building to be completed. Modern architectural models, especially for large building projects such as office towers and civic infrastructure projects such as bridges or tunnels, are typically comprehensive digital representations of physical and functional characteristics of the facility to be built, which may be referred to in the art as Building Information Models (BIM), Virtual Buildings, or Integrated Project Models. For convenience of presentation, a BIM, as used herein, will refer generically to a digital representation of a building that comprises sufficient information to represent, and generate two-dimensional (2D) or three-dimensional (3D) representations of, portions of the building as well as its various components, including by way of example: structural supports, flooring, walls, windows, doors, roofing, plumbing, and electrical wiring.

A building project is also typically performed in accordance with a bar chart, which may be referred to as a "Gantt chart", that lists tasks to be performed on a vertical axis and time intervals on a horizontal axis so that the width of the horizontal bars in the chart shows the duration of each task.

SUMMARY

An aspect of an embodiment of the disclosure relates to providing a system, hereinafter also referred to as "a BuildMonitor system", which operates to track, optionally in real time, progress of a building under construction.

A "building", as used herein, refers to any constructed or renovated facility and thus includes, without limitation, residential buildings such as single-unit detached houses or residential towers, commercial buildings, warehouses, manufacturing facilities, and infrastructure facilities such as bridges, ports, and tunnels.

A BuildMonitor system in accordance with an embodiment of the disclosure comprises a selection of one or a combination of two or more of the following modules: a Flow Building Module (FBM) that operates to generate a "flow model" that represents a building plan for constructing a building based on a BIM of the building; a Locator Module that operates to determine a relatively accurate location of a camera within a building, optionally responsive to an image captured by the camera and/or a digital, optionally 3D, representation of the building; a Binder Module that operates to discern progress of a flow model associated with a building under construction, based on one or more images captured at the building associated with the flow model; a Predictor Module that operates to predict aspects of future progress of a flow model based on a current state of the flow model; and a Presenter Module that operates to generate reports and images regarding a building under construction responsive to a progress of a flow model associated with the building for use, by way of example, to guide project management decisions.

In an embodiment, a flow model comprises a plurality of nodes, with each node (which may be referred to herein as a "construction action element" or "CAE") representing a portion of the building represented by way of example in a BIM. The flow model can be represented as a directional graph comprising ordered pairs of CAEs associated via directed edges that describe an ordered sequence for performing CAEs during a construction project. Optionally, each CAE is further represented as a sequential set of nodes that may be referred to as "construction states" that represent stages for performing the CAE. For convenience of presentation, an aggregate of states characterizing each of a plurality of CAEs comprised in a flow mode at a given time may be referred to herein as a "state of the flow model" or a "state of the building project".

In an embodiment, a BuildMonitor system comprises an optionally cloud based, data monitoring and processing hub having software and hardware, including a processor operating in accordance with a set of instructions and data stored in a memory, that supports functions such as optionally those of one or a combination of two or more modules selected from the group consisting of: the FBM, the Locator Module, the Binder Module, the Predictor Module, and the Presenter Module. The BuildMonitor system may comprise a one or more network-connected image acquisition devices, which may be referred to herein as "Site-Trackers", that can be placed in a building site and are operable to communicate with the hub through a communication network, to capture, process, and transmit images captured from the building site to the hub.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIG. 5A schematically shows an example of a equirectangular projection of a 360-degree spherical photograph of a building site captured by a Site-tracker in accordance with an embodiment of the disclosure;

FIG. 5B schematically shows a semantically segmented image based on the image shown in FIG. 5A, as generated during a Locator process in accordance with an embodiment of the disclosure;

FIG. 12 schematically shows an example project overview created by a Presenter Module in accordance with an embodiment of the disclosure.

DETAILED DESCRIPTION

In the following detailed description, components of a BuildMonitor system in accordance with an embodiment of the disclosure operating to track progress of one or more building projects are discussed with reference to FIG. 1A. FIG. 1B schematically shows Site-Trackers monitoring a building project. Operation of Site-trackers, as well as a FBM, a Locator Module, a Binder Module, a Predictor Module, and a Presenter Module comprised in a BuildMonitor system in accordance with an embodiment of the disclosure are discussed with reference to those and other figures.

Figure 1A:
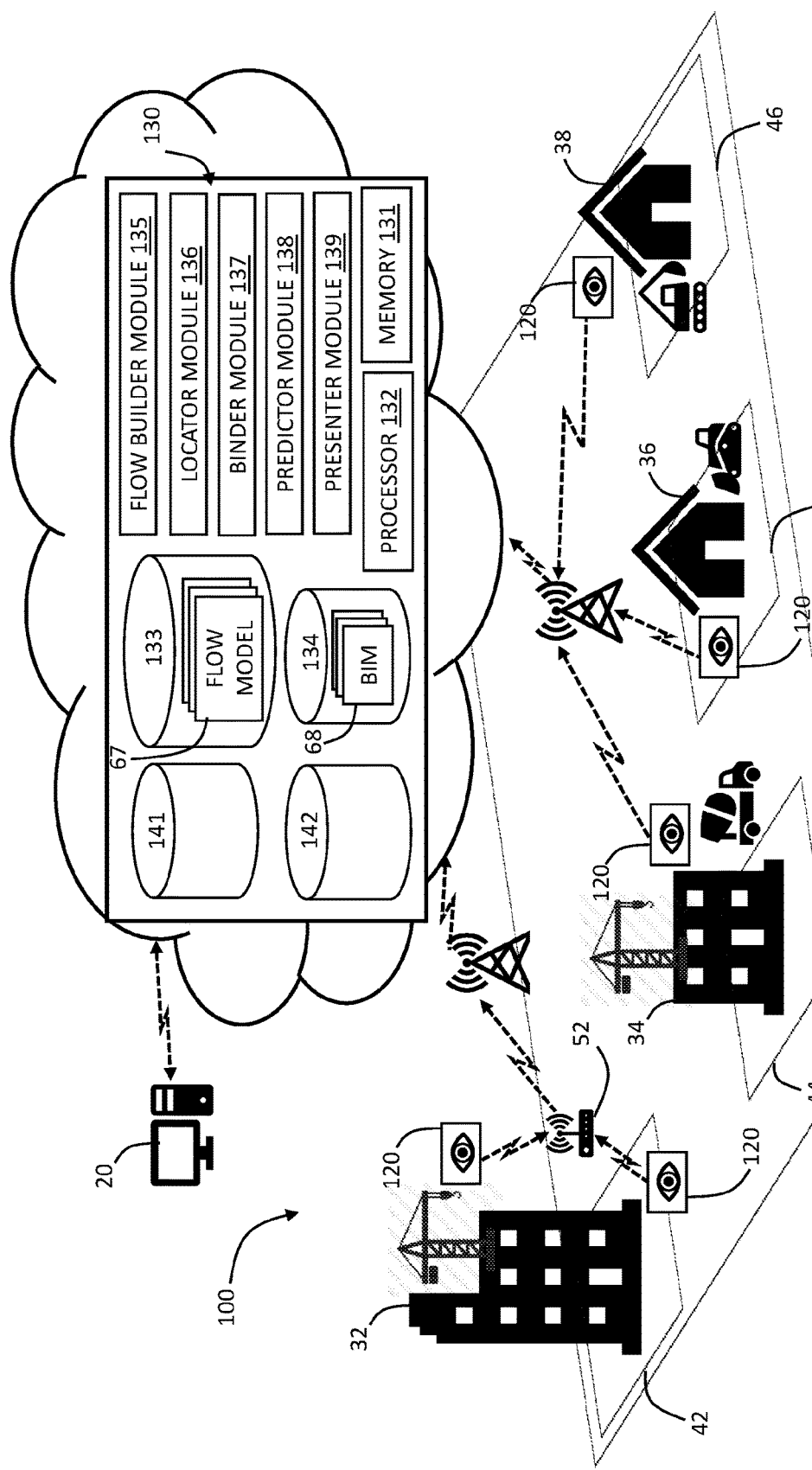
FIG. 1A schematically shows a plurality of building projects monitored by a BuildMonitor system comprising cloud-based data monitoring and processing hub and a plurality of Site-Monitors in accordance with an embodiment of the disclosure.
Figure 1B:
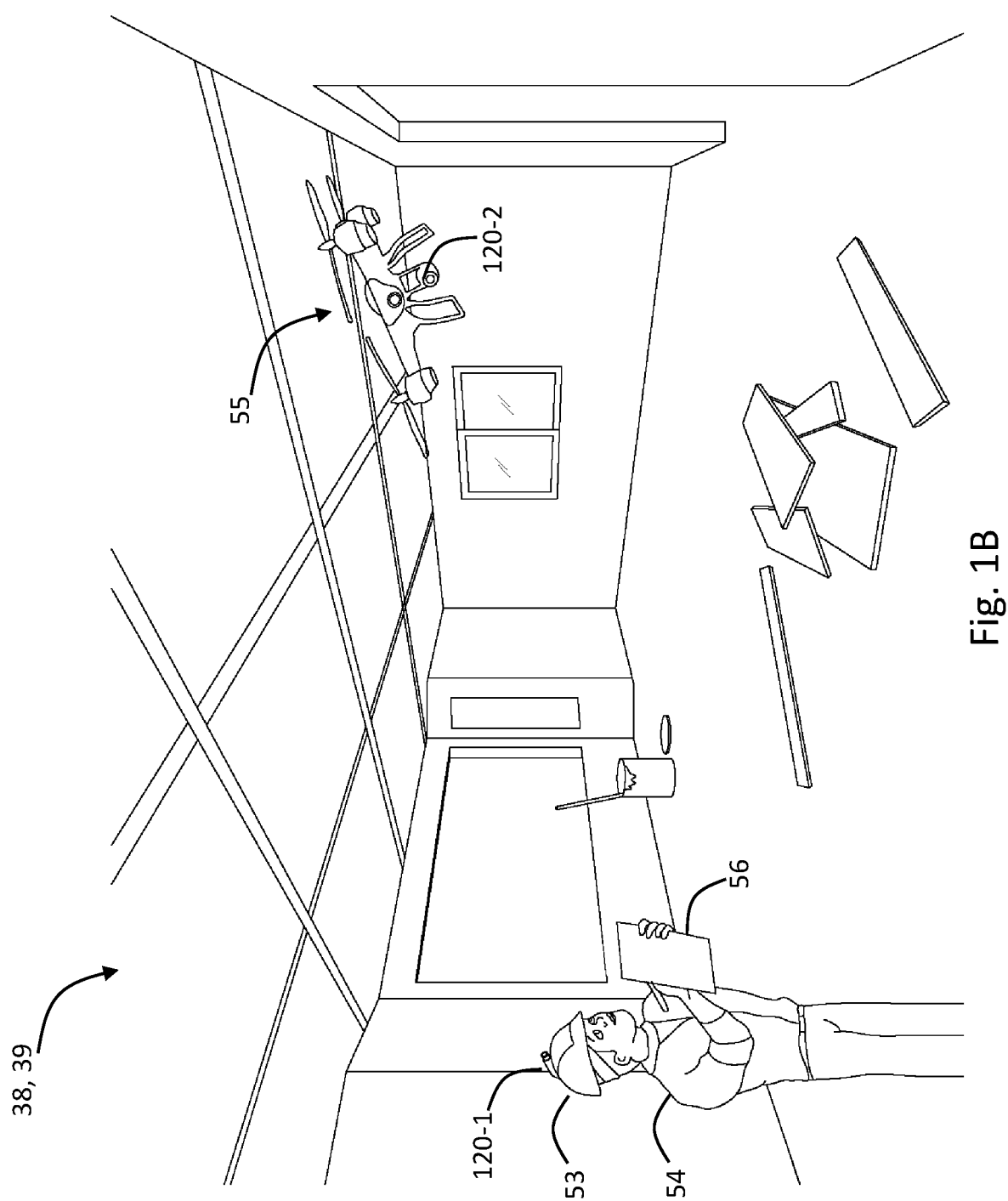
FIG. 1B schematically shows a room in a building shown in FIG. 1A being monitored by Site-Trackers in accordance with an embodiment of the disclosure.

Reference is made to FIG. 1A, which schematically shows a perspective view of a BuildMonitor system 100, operating to track progress of a plurality of ongoing building projects, respectively, a first office tower 32 being constructed in a building site 42, a second office tower 34 being constructed in a building site 44, a first house 36 being constructed in a building site 46, and a second house 38 being constructed in a building site 48.

BuildMonitor system 100 optionally comprises a data monitoring and processing hub 130 that may, as shown in FIG. 1A, be cloud based, and a plurality of Site-Trackers 120 located at building sites 42, 44, 46, 48. In FIG. 1A, for convenience of presentation and to accommodate constraints on sizes of images shown in the figures, one or two Site-Monitors are shown over or on the buildings at the respective building site. However, Site-Trackers 120 can be located inside a partially construction building, and each building may, depending on the size of the building, have dozens of Site-Monitors monitoring portions of the building.

Hub 130 optionally has a memory 131 and a processor 132 configured to support functionalities of the hub, may comprise any combination of hardware and software components, and may comprise or be a virtual entity.

Site-Trackers 120 are configured to transmit images they acquire from building sites they monitor to hub 130. The Site-Trackers may transmit images as captured to the hub, and/or as processed locally before forwarding the processed images to the hub. Optionally, BuildMonitor system 100 comprises one or more aggregator devices 52 that receives data from one or more Site-Trackers 120 at a given building site and forward the received data to hub 130. Aggregator device 52 optionally forwards data as received, and/or as processed by the aggregator device.

Site-Tracker 120 comprises an image capture device for capturing images of a building site, which may be, by way of example, an optical imaging device (a camera); a LIDAR-based imaging device, a sonic imaging device, and a radio-wave-based imaging device. The camera may be operable to capture panoramic images, optionally 360-degree images. Site-Tracker 120 may comprise one or more of: a data storage device configured to store images captured by the image capture device, a wireless communication module configured to transmit information including images captured by the image capturing device to an external device, by way of example, hub 130, and a position tracking device for tracking movement and position of itself. The position tracking device may comprise one or more of: a Global Positioning System (GPS) tracking device, a barometer, and an inertial measurement unit (IMU). Site tracker 120 may further comprise a data port to establish a wired connection with a communications network, through which images stored in the data storage device may be transmitted to an external device such as hub 130. Site Tracker 120 further comprises a processing unit and a memory storing a set of instructions, wherein the processing unit operates and/or coordinates activities of any one or more of the image capturing device, the wireless communication module, the position tracking device, and the data storage device.

Site-Tracker 120 may comprise or is comprised in a smartphone. The Site-Tracker may be mounted on a wearable equipment to be worn by a human operator at a building site. By way of example, the wearable equipment may be a helmet, or a harness configured to secure the Site-Tracker onto the human operator's arm or chest. Alternatively, the Site-Tracker may be mounted on a ground or aerial vehicle that is remotely operated by a user or autonomously controlled.

Reference is made to FIG. 1B schematically showing two exemplary Site-Trackers monitoring a room 39 comprised in house 38 (FIG. 1A) that is under construction. A first Site-Tracker 120-1 is mounted on a helmet 53 worn by a construction worker 54, and a second Site-Tracker 120-2 is mounted on a quadcopter 55. Images captured by Site-Trackers 120-1 and 120-2 can be used by BuildMonitor 100 to automatically track in real time the progress of the construction of room 39 and more generally the construction of house 38.

For the tracking of construction progress of a building, BuildMonitor 100 in accordance with an embodiment of the disclosure is operable to generate, store, and update a flow model that represents a plan for constructing a building or a portion thereof. By way of example, flow models 67 representing a prospective building plan for each of buildings 32, 34, 36, 38, respectively are stored in a Flow Model Database (DB) 133, optionally comprised in hub 130. Flow Model DB 133 optionally further comprises flow models representing construction plans for other building that were already completed in the past, as well as flow models for future building not yet under construction. Flow Model DB optionally further stores historic building plans and records of building plan execution. Optionally, the historic building plans and building plan execution records are converted into, and stored as, a flow model in accordance with an embodiment of the disclosure.

A flow model associated with a building optionally may comprise a directional graph, in which each node (a "construction action element" or "CAE") represents a construction task to be performed, with each CAE being linked to at least one other CAE via directed edges so that the graph describes an ordered sequence of CAEs that are to be performed toward completing a building. A CAE may represent an action and/or a structural portion of the building to be built, installed, or arranged. A flow model may be processed by a construction task management tool to generate a visualization of workflow, by way of example a Gantt chart, or to coordinate generation of work orders for contractors and individual construction workers to order execution of specific construction tasks.

Figure 2A:
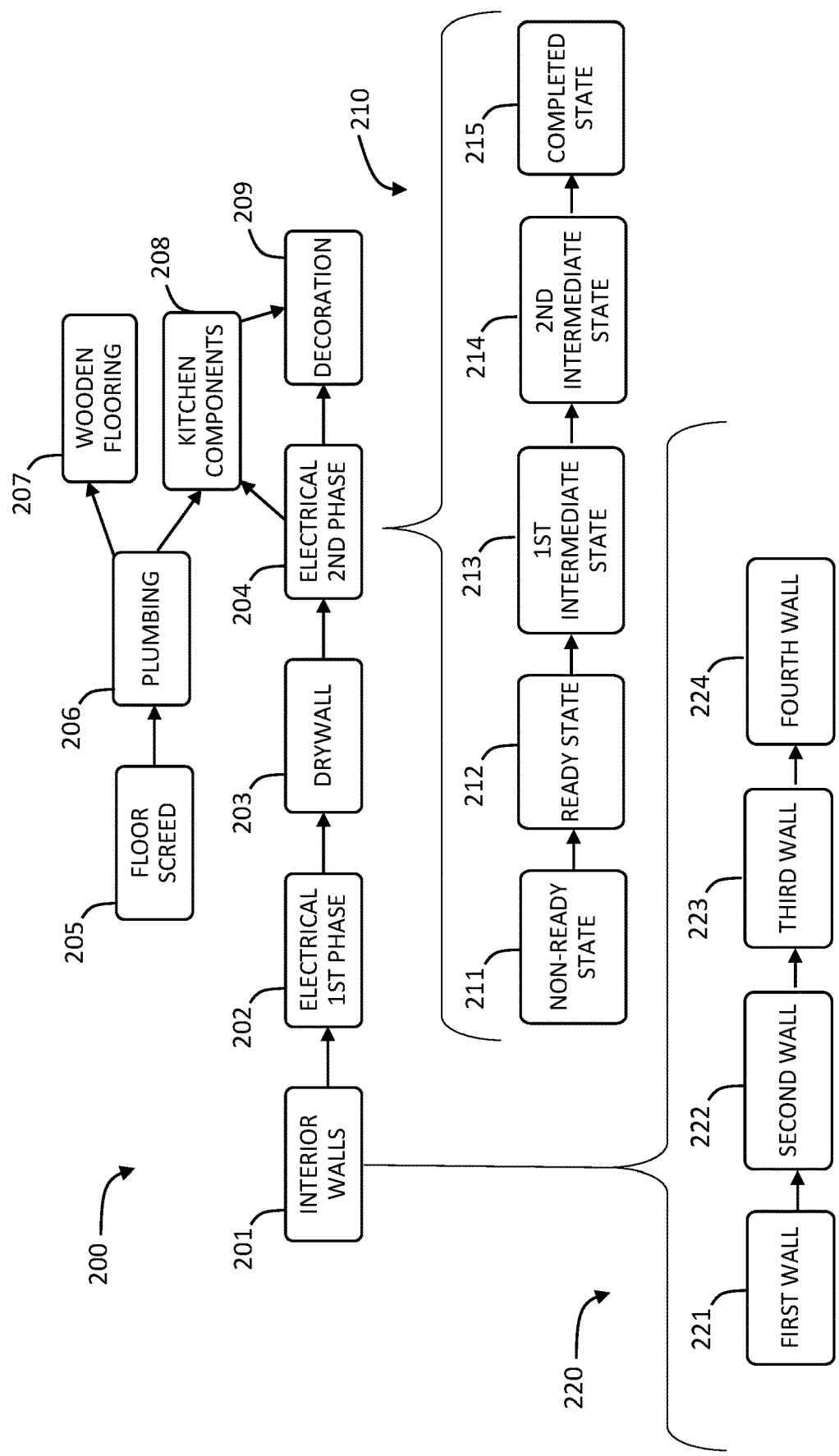
FIG. 2A schematically shows an example flow model of a building project, in accordance with an embodiment of the disclosure.

Reference is made to FIG. 2A, which schematically shows an example flow model 200 representing a construction plan for room 39, a portion of house 38 (FIGS. 1A and 1B), which is to be a kitchen. As shown in FIG. 2A, flow model 200 is optionally presented as a directional graph comprising the following CAEs as nodes: interior walls CAE 201, electrical $1^{st}$ phase CAE 202, drywall CAE 203, electrical $2^{nd}$ phase CAE 204, floor screed CAE 205, plumbing CAE 206, wooden flooring CAE 207, kitchen components CAE 208, and decoration CAE 209. In many cases, performance of certain CAEs should start after other CAEs have been completed, and the sequence of CAEs in the flow model optionally reflects order dependencies present in a construction plan.

By way of example, kitchen components 208 should be installed only after the plumbing and electrical components have been completed in the room. To reflect this order dependency, the directional graph of flow model 200 is arranged so that the construction components of plumbing 206, electrical $1^{st}$ phase 202, and electrical $2^{nd}$ phase are all predecessors of kitchen components 208, with plumbing 206 and electrical $2^{nd}$ phase 204 being direct predecessors of kitchen components 208.

By way of another example, certain electrical components, such as electrical cables for connecting electrical outlets to a central distribution board are typically located with or along interior walls and thus should be installed after the interior walls have been built. However, the electrical cables should be installed prior to drywalling to so that the drywall provides protection for the cables as well as better aesthetics for the finished room by hiding the cables. After the drywall is installed, other electrical components, such as the electrical outlets that connect to the wiring, should then be installed to complete the installation of the electrical components for the room. The directional graph of flow model 200 may be arranged to reflect this order dependency so that interior walls 201 is a direct predecessor of electrical $1^{st}$ phase 202 (relating to electrical cable installation), which is in turn a direct predecessor of drywall 203, which is in turn a direct predecessor of electrical $2^{nd}$ phase 204 (relating to electrical outlet installation).

A model in accordance with an embodiment of the disclosure may further comprise a set of states, which may be referred to herein as "construction states" or "CAE states", that characterize a status or constituent activity for a given CAE. A set of CAE states for a CAE may respectively indicate degrees of progress towards completion of the CAE. The set of construction states may comprise at least the following two states: a "ready state" indicating that construction of the CAE can begin; and a "completed state" indicating construction of the CAE has been completed. Optionally, the set of construction states comprises a "non-ready state" that precedes a ready state and indicates that execution of the CAE cannot yet begin due one or more predecessor CAEs having not yet been completed. In a case where a set of construction states includes a non-ready state, progression from the non-ready state to a ready state may be based on all direct predecessor CAEs having progressed to a completed state.

Optionally, a set of construction states for characterizing a CAE is represented as nested nodes within a CAE, optionally starting from a non-ready state or a ready state and terminating at a completed state. It will therefore be appreciated that a given CAE that is represented as a node in a directed graph may be expanded to be represented by a plurality of nodes representing the construction states available for the CAE.

FIG. 2A schematically shows an example directional graph 210 comprising, as nodes, the following construction states that are available for characterizing CAE 204: a non-ready state 211, a ready state 212, a $1^{st}$ intermediate state 213, a $2^{nd}$ intermediate state 214, and a completed state 216.

A CAE may be subdivided into component CAEs. By way of example, the interior walls CAE 201 may be subdivided into the construction of individual walls, the plumbing CAE 206 may be subdivided into installation of individual pipes or pipe segments, and the kitchen components CAE 208 may be subdivided into installation of a stove, an oven, a sink, and one or more counters and cabinets. A flow model may represent such component CAEs as nested nodes. It will therefore be appreciated that a given CAE that is represented as a node in a directed graph may be expanded to be represented by a plurality of nested nodes representing component CAEs.

FIG. 2A schematically shows by way of example a set 220 of nested CAEs comprising components of interior walls CAE 201, the nested CAE set 220 comprising a first wall CAE 221, a second wall CAE 222, a third wall CAE 223 and a fourth wall CAE 224. Conversely, a given CAE may be a portion of a broader CAE. By way of example, all CAEs of flow model 200 may be components of a broader CAE (not shown) representing the building of room 39.

BuildMonitor system 100 optionally comprises one or more selections from the following modules: a Flow Builder Module ("FBM") 135 that operates to generate a flow model for a building, a Locator Module 136 that operates to determine a relatively accurate position of a camera within a building, a Binder Module 137 that operates to discern progress of a flow model associated with a building under construction, a Predictor Module 138 that operates to predict aspects of future progress of a flow model based on a current state of the flow model, and a Presenter Module 139 that operates to generate reports and images regarding a building under construction responsive to a progress of the associate flow model. Each of FBM 135, Locator Module 136, Binding Module 137, Predictor Module 138, and Presenter Module 139 are optionally comprised in hub 130, and operates in accordance with respective sets of instructions optionally stored in memory 131 and executed by processer 132. The various modules may, as appropriate, access or generate data stored in one of a plurality of databases, including: a Flow Model DB 133 for storing flow models representing construction plans; a BIM database 134 for storing or managing access to digital representations of buildings that comprises sufficient information to represent, and generate two-dimensional (2D) or three-dimensional (3D) representations of portions of the building as well as its various components; an image database 141 for storing images and video footage captured from buildings during the construction process; and classifier database 142 for storing or managing access to classifiers respectively designated to process images captured from construction sites and evaluate progress of construction of the site.

Flow Builder Module ("FBM") 135 optionally operates to generate a flow model that represents a building plan for constructing a building, based on a BIM of the building. By way of example, a construction management company contracted to build house 38 has access to a BIM 68 that represents house 38. Examples of BIMs includes model created using software platforms for building design that are known in the art, such as Revit® (by AutoDesk®), ArchiCAD® (by Graphisoft®), and FreeCAD®. The construction management company, wanting a flow model that breaks down steps for constructing building 38, submits a copy of BIM 68 to hub 130 for storage in a BIM database 134 (as shown in FIG. 1A), or grants FBM 134 access to a copy of BIM 68 stored elsewhere.

Figure 2B:
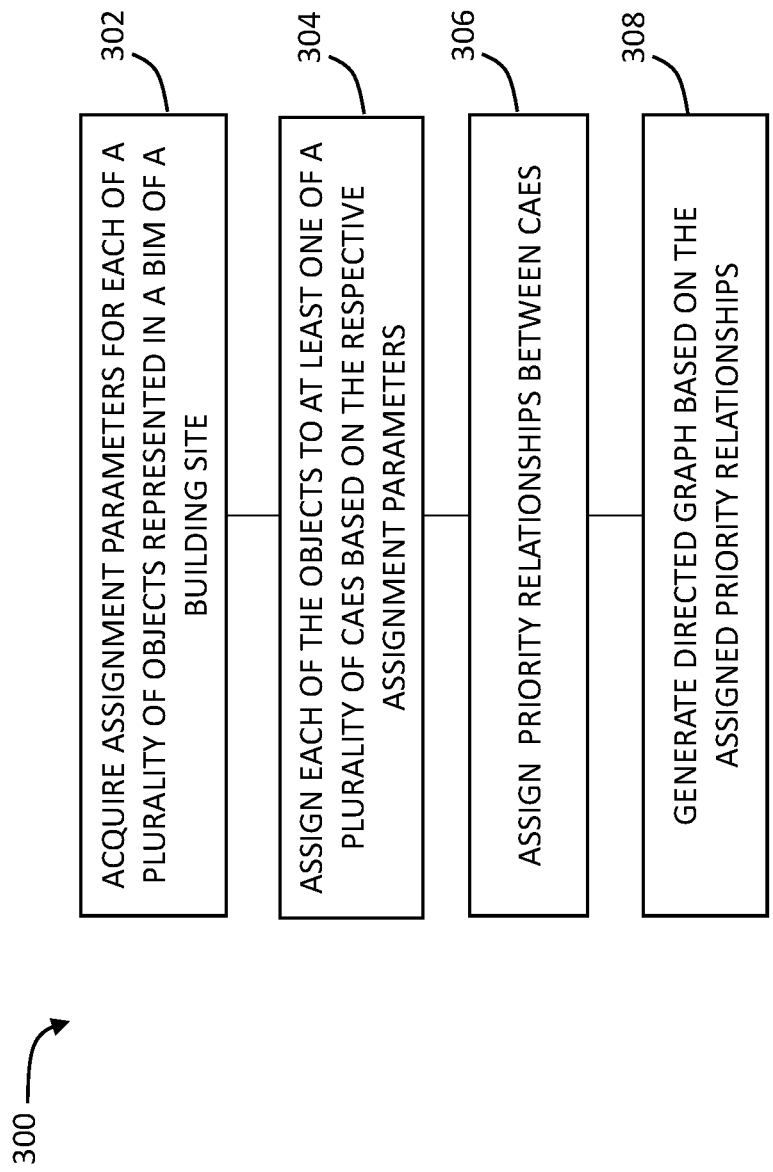
FIG. 2B, shows a flow diagram describing a Flow Builder process in accordance with an embodiment of the disclosure.

Reference is made to FIG. 2B, which shows a flow diagram 300 of a Flow Builder process in accordance with an embodiment of the disclosure. Once FBM 134 has access to a BIM describing a building, the FBM applies Flow Builder process 300 to generate a flow model describing a construction plan for the building or a portion thereof based on data comprised in the BIM.

A BIM of a building comprises representations of objects to be constructed in the building Typically, each represented object is associated with an object category, such as walls, windows, plumbing. However, the object categories are typically non-standard categories used by individual architects or architecture companies.

In a block 302, FBM 134 acquires a plurality of parameters ("assignment parameters") for each of a plurality of construction objects designated to be installed or built in a building site during construction. The plurality of objects may be represented in the BIM and/or stored in a record of objects associated with a building site. Assignment parameters may be any parameter relating to an object that may be used to assign the object to at least one of a plurality of CAEs. The plurality of CAEs may be a pool of pre-designated elements, optionally designate or generated by a user of the Buildmonitor system, and optionally stored in memory 131 or flow model DB 133, from which FBM 134 may select for assigning to an object for generating a flow model.

An assignment parameter may be a physical parameter of the object as represented in the BIM, which may include the object's physical dimensions and/or geometric shape as represented in the BIM, and a physical proximity of the object with another objects represented in the BIM. An assignment parameter may be a semantic parameter, such as an object's name or a category as designated in the BIM, by way of example as an object metadata entry. The metadata entry may be a selection from the group consisting of an object category, an object manufacturer, an object model identifier, and a description of object material. As assignment parameter may be a contextual parameter describing the object's "construction relationship" with other objects, such as the object being hung on, attached to, built upon, or installed with another object. A contextual parameter may include an identity of a construction service provider assigned to build or install the object. A BIM may include contextual parameters for some objects, by way of example as metadata. However, some BIMs may be partially or totally lacking in contextual parameters. Contextual parameters may be assigned based on information comprised in a Gantt chart of the building site. Gantt charts, in addition to building tasks and expected time intervals for performing those tasks, may in some cases include additional information about the building process, by way of example dependency relationships between tasks, workforce and material requirements for the tasks. Contextual parameters may be assigned based on custom parameters defined by a user of the FBM, by way of example a user operating a computer interface for FMB 134 running on terminal 20.

In a block 304, FBM 134 assigns the plurality of objects into one or more CAEs, responsive to a respective set of assignment parameters describing each of the plurality of objects. Each object may be represented as an object feature vector OFV having components $ofv_i$, $1 \leq i \leq I$, OFV=$\{ofv_1, ofv_2, \ldots, ofv_I\}$, where $\{ofv_i\}$ comprises the set of parameters including physical parameters, semantic parameters, and contextual parameters of the object acquired in block 302. The object's OFV may be processed by one or more classifiers, optionally stored in classifier database 142, to assign the object to at least one of a plurality of CAEs. The classifier is optionally one of the following classifier types: a decision tree, a Support Vector Machine (SVM), a Random Forest classifier and/or a Nearest Neighbor classifier. A classifier may be a [YS1][KH2]neural network trained through a machine learning process with appropriate training data, by way of example a set of input OFVs, each OFV paired respectively with target CAEs. Once an object is assigned with at least one CAE, the CAE assignment may be included as an additional feature in the object OFV for further processing. An OFV may be processed by a plurality of classifiers in series to resolve CAE assignment. By way of example, a first classifier may fail to assign a CAE to an object with sufficient level of confidence based on the object's OFV, but may narrow down the possibilities to one or a few candidate CAE. The OFV may then be processed by a different classifier that is better suited to resolve the CAE assignment between the limited number of candidate CAEs. By way of example, an object described in a BIM as a wooden beam is determined by a Nearest Neighbor classifier to be assigned to wooden flooring CAE 207 and to decoration CAE 209, and the FBM adds this result is added to the wooden beam's OFV. The FBM then selects, based on the newly added candidate CAEs, one or more additional classifiers more specialized for resolving certain CAEs including a CAE 207 and/or CAE 209. By way of example, the additional classifiers include a neural network that serves as binary classifier for CAE 209 to provide yes/no answer for whether or not the OFV is consistent with being assigned with CAE 209.

In a block 306, the FBM arranges the CAEs in an ordered sequence to generate a flow model. The ordered sequence may represent a series of pre-requisite CAEs, in which the preceding CAE must or should be completed before the following CAE is be initiated. The ordered sequence may comprise a linear sequence in which one CAE is preceded by one other CAE, a branching sequence in which one CAE is followed by a plurality of difference CAEs, or a converging sequence in which one CAE is preceded by a plurality of different CAE. The sequence may be arranged based on CAE identify and/or assignment data of an object assigned to a respective CAE.

The FBM optionally applies a rules-based procedure responsive to a set of Priority of Construction (PoC) Rules, optionally stored in memory 131, configured to assign a "priority relationship" for pairs of CAEs that defines which CAE of a given CAE pair is to be performed first. The pairs of CAEs may be selected based on at least one object associated with a first CAE having a construction relationship with least one object associated with a second CAE, and/or based on an identity of a construction service provider assigned to build or install objects assigned to the CAE. PoC rules may be based on information comprised in the BIM or a Gantt chart, or based on custom parameters defined by a user of the FBM$_{[YS3]}$. PoC rules may be a set of pre-defined rules manually set by a user of the Build-monitor system interfacing with the FBM, by way of example through computer terminal 20. [[KH: It's not clear to me now how the POC Rules work. Can these POC Rules be implemented with classifier also?]]

Examples of a PoC Rule include "a floor screed CAE precedes a wooden flooring CAE", "a plumbing CAE precedes a wooden flooring CAE", or "a plumbing CAE precedes a kitchen components CAE", provided that the CAEs are assigned to a same room in a building site. Such rules can be used by the FBM to, by way of example, arrange floor screen CAE 205, plumbing CAE 206, wooden flooring CAE 207, and kitchen components 208.

By way of example, a set of PoC Rules may be expressed at least in part as a rule table indicating a priority relationship for various pairs of CAEs. An example of a portion of such a rule table is shown herein below as Table 1:

TABLE 1

| | Plumbing | Wooden Flooring | Interior walls | Electrical phase 1 | Drywall | Electrical phase 2 |
|---|---|---|---|---|---|---|
| Plumbing | | | | | | |
| Wooden Flooring | Plumbing | | | | | |
| Interior walls | Null | Null | | | | |
| Electrical phase 1 | Null | Null | Interior walls | | | |
| Drywall | Null | Null | Interior walls | Electrical phase 1 | | |
| Electrical phase 2 | Null | Null | Interior walls | Electrical phase 1 | Drywall | |
| Kitchen comp. | Plumbing | Null | Interior walls | Electrical phase 1 | Drywall | Electrical phase 2 |

Table shows all possible pairs between seven CAEs: Plumbing, Wooden Flooring, Interior Wall, Electrical Phase 1, Drywall, Electrical phase 2, and Kitchen components, which each cell showing which of the two CAEs have priority and should be completed before the other. A rule table such as the one shown in Table 1 may be saved in memory 131 and accessed by FBM 135 to arrange the order of CAEs 201-204 and 206-208 as shown in FIG. 2A. Additionally or alternatively, the FBM may process OFVs of objects assigned to CAEs, optionally having CAE assignment as an OFV feature, with appropriate classifiers to arrange the order of the CAEs.

In a block 308, the FBM optionally generates a directed graph comprising a plurality of nodes and a plurality of directed edges, wherein each node corresponds to one of the plurality of CAEs and the association between pairs of nodes by a directed edge is based on the respective priority relationships between the pairs of CAEs. The resulting directed graph is designated as a flow model that describes an ordered sequence for performing the CAEs, resulting in the building described in the BIM.

A flow model in accordance with an embodiment of the disclosure can be utilized for a variety for purposes during construction of a building. As noted above, the flow model can be used as a prospective model that presents the construction of an entire building or a portion thereof as an orderly sequence of manageable, subdivided elements to advantageously allow for more accurate project planning and allocation of future resources. In addition, a flow model associated with a given building project can be shared among computer devices operated by various stakeholders of the project, as a resource for facilitate coordinating their actions. By way of example, once flow model 200 describing a construction plan for room 39, or a larger flow model (not shown) comprehensively describing a construction plan for house 38, of which flow model 200 is a part, hub 130 may distribute, or grant access to, the flow model to a computer terminal 20 (FIG. 1A) operated at a construction management company, as well as to a tablet computer 56 operated by construction worker 54 at the construction site of house 38 for visualization by the respective computer devices.

In an embodiment, BuildMonitor system 100 comprises a Locator Module 136 that operates to determine a relatively accurate position of a Site-Tracker within a site of a building project at a time the one or more images were captured, optionally responsive to the one or more images, and optionally further responsive to a digital model of the building site and/or a presumed state of the flow model.

Figure 3:
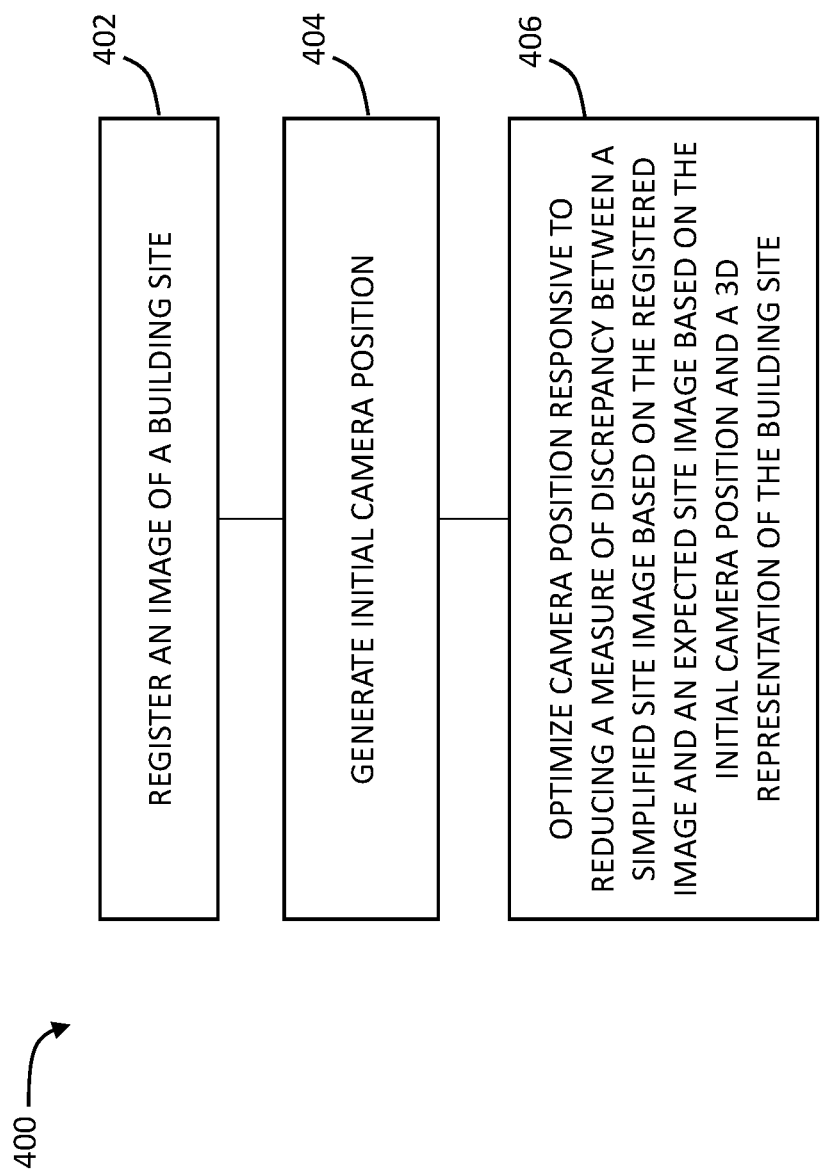
FIG. 3 shows a flow diagram describing a Locator process in accordance with an embodiment of the disclosure.

Reference is made to FIG. 3, which shows a flow diagram 400 of a Locator process in accordance with an embodiment of the disclosure as performed by Locator Module 136. Locator Module 136 may process images to determine a camera position in real time or at a later time after the images were captured in an earlier time period and stored by way of example in an image database 141.

In a block 402, Locator Module 136 registers an image of a building site captured by an image capture device, by way of example a camera comprised in Site-Tracker 120-1 (as shown in FIG. 1B). The image is optionally a panoramic photograph or a 360-degree spherical photograph. The image may be light-adjusted, contrast-enhanced, aligned to principle axes, or otherwise adjusted to ease subsequent processing.

In a block 404, the Locator Module generates at least one initial camera position ("ICP"). The ICP may be defined according to 2 degrees of freedom ("DOF") that includes a translational position along a front/back axis (which may be referred to as "x") and a translational position along a left/right axis (which may be referred to as "y"), according to 3 DOF that includes a translational position along an up/down axis (which may be referred to as "z") in addition to x and y, or according to 6 DOF that includes the rotational positions of pitch, yaw and roll in addition to the translational positions of x, y and z.

Optionally, each section, by way of example a room, of a building site is labeled with a unique symbol, which may be referred to as a "section label", that uniquely identifies each section of the building site. The section label may, by way of example, comprise a unique code, such as a barcode or a QR code, that can be registered by a camera, as well as a known size, a known shape, and a known position within the section. Optionally, an ICP is determined by capturing an image the section label, identifying the building site section responsive to the unique code comprised in the section label, and determining a position of the camera relative to the position of the section label based on the size, shape, and position of section label on the captured image.

Alternatively or in combination, the ICP is determined based on a previously determined position of the camera. Optionally, the determination of camera position is based on adjusting a previously determined position responsive to IMU data that was recorded between a current time and a time of the previously determined position. The previously determined position is optionally a chronologically earlier position of the camera, or alternatively a chronologically later position of the camera. Optionally, the ICP is determined based on previously determined camera positions through use of a SLAM (simultaneous localizing and mapping) algorithm, in which a camera position and a map of the environment in which the camera is situated are simultaneously recovered while the Site-Tracker on which the camera is mounted moves through the environment. Alternatively or in combination, the ICP is determined based on information from one or more position trackers mounted with the camera on a Site-Tracker. The one or more position trackers may include, by way of example, one or more of: a GPS tracker, a barometer, a Bluetooth Low Energy ("BLE") Beacon, a magnetometer, and a Wi-Fi transceiver. Alternatively or in combination, the ICP is determined based on information, optionally a manually determined camera position, provided by a user interfacing with the Locator Module, by way of example through computer terminal 20.

In a block 406, the Locator Module optimizes the camera position to arrive at an optimized camera position ("OCP"). Optionally, the Locator module iteratively generates a plurality of proposed camera positions ("PCP"), starting from the ICP and arriving at the OCP, responsive to reducing a measure of discrepancy between a simplified site image based on the captured image and an expected site image based on the PCP and a reference digital representation of the building, optionally a floor plan and/or a 3D representation of the building. The camera position optimization may be performed with a plurality of different ICPs to arrive at a plurality of OCP, with the best OCP from the plurality of OCPs being selected as the actual OCP.

Optionally, a simplified site image is an image based on the image captured in block 402, in which each pixel is assigned one or more of a plurality of predefined categories. Each pixel may be assigned a likelihood value for each of the plurality of categories. Optionally, pixels of the expected site image are each assigned one or more the same plurality of predefined categories in accordance with a same assignment scheme as the simplified site image. The simplified site image may be generated by evaluating the captured site image with a neural network module. The neural network module is optionally characterized with an Encoder-Decoder architecture that optionally comprises Convolutional Neural Network (CNN) Encoders and/or CNN Decoders. Alternatively or additionally, the simplified site image may be generated based on "classical" computer vision algorithms that do not make use of neural networks. Optionally, the measure of discrepancy between the simplified site image and expected site image is evaluated separately for each category of the plurality of predefined categories, then combined to arrive at a combined measure of discrepancy.

Figure 4A:
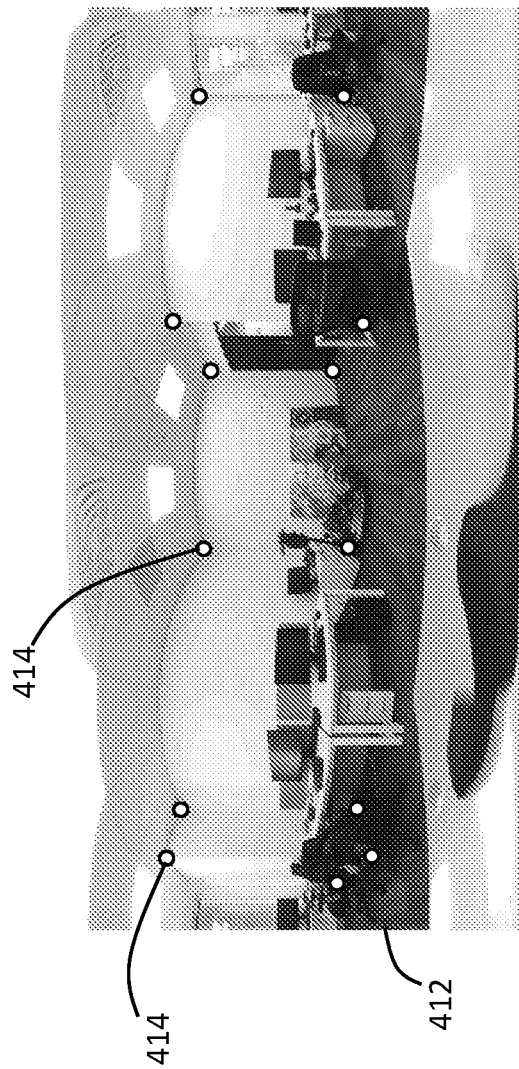
FIG. 4A schematically shows a corner map based on an equirectangular projection of a 360-degree spherical photograph of a building site captured by a Site-tracker, as generated during a Locator process in accordance with an embodiment of the disclosure.

Optionally, the simplified site image is a corner map wherein the plurality of predefined categories comprises a null category, and a corner. Reference is made to FIG. 4A which shows an example corner map comprising a plurality of points 414 categorized as a corner, indicating location of corners where two walls connect with one of a floor or a ceiling. The corner map is generated from photographic image 412, which is an equirectangular projection of a 360-degree spherical photograph taken inside a room. As shown in FIG. 4A, the corner map is overlaid onto photographic image 412 in order to show that corner points 414 overlap with the corners of the room. Optionally, the simplified site image is a depth map wherein the plurality of predefined categories comprises a depth value indicating a distance between the camera a respective location within the imaged building site corresponding to the pixel.

Figure 4B:
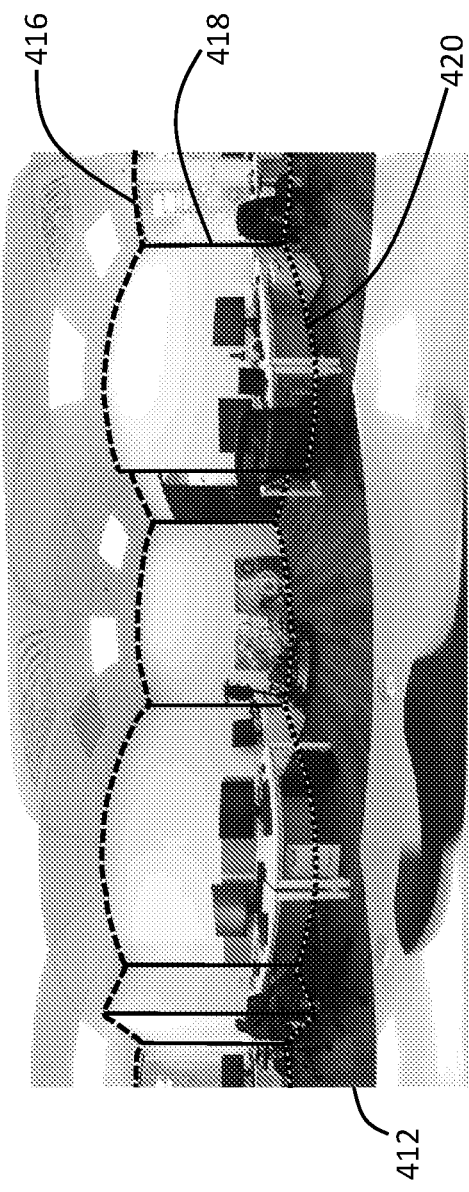
FIG. 4B schematically shows a boundary map based on an equirectangular projection of a 360-degree spherical photograph of a building site captured by a Site-tracker, as generated during a Locator process in accordance with an embodiment of the disclosure.

Optionally, the simplified site image is a boundary map wherein the plurality of predefined categories comprises a null category, a wall-wall boundary, a wall-floor boundary, and a wall-ceiling boundary. Reference is made to FIG. 4B which shows an example boundary map generated from photographic image 412, the boundary map comprising dashed lines 416 representing pixels categorized as wall-ceiling boundary, solid lines 418 representing pixels categorized as wall-wall boundary, and dotted lines 420 representing pixels categorized as wall-floor boundary. As shown in FIG. 4B, the corner map is overlaid onto photographic image 412.

Optionally, the simplified site image is a semantically segmented image, wherein the plurality of predefined categories comprises one or more of: a floor, a ceiling, and a wall. Optionally, the plurality of predefined categories further comprises one or more of a window and a door. See, by way of example, a semantically segmented image 424 shown in FIG. 5B, which is based on photograph 422 shown in FIG. 5A. Semantically segmented image 424 as shown in FIG. 5B displays a single category per pixel. However, each pixel of image 424 may be characterized with a likelihood value for each category respectively, and the image shown in FIG. 5B shows only the category with the highest likelihood value for each pixel. By way of example, a given pixel shown as being characterized as a wall in semantically segmented image 424 may be characterized as having a 85% likelihood of being a wall, a 10% likelihood of being a ceiling, a 5% likelihood of being a floor, and a 0% likelihood of being any one or the remaining categories.

An expected site image is optionally a computer-rendered image of the building site as would be captured by a virtual camera located and oriented within a 3D representation according to a given PCP. See, by way of example, an expected site image 432 shown in FIG. 6A, which is generated from a 3D representation of the room photographed in photograph 422 (FIG. 5A).

The 3D representation used to generate the expected image optionally represents a partially constructed building that is optionally based on the BIM and/or a Gantt chart of the building, and responsive to a presumed level of progress of construction of the building at the time of image capture. Optionally, the presumed level of progress is based on a state of the flow model associated with the building.

Optimization of an ICP towards an OCP may be performed responsive to one or more measures of position discrepancy based on a comparison between a simplified site image based on a captured image and a corresponding expected site image based on an ICP (or subsequent PCP) and a 3D representation of the building. Optionally, the measure of discrepancy is a combined measure of discrepancy comprising measures of discrepancy determined based on an evaluation of any two or more of semantically segmented images, boundary maps, depth maps, and corner maps.

Measures of discrepancy that are based on non-image inputs from a Site Tracker may be included in a combined discrepancy measure. Optionally, a measure of discrepancy is based on a comparison between a PCP and a calculated camera position based on a previously determined OCP and IMU data recorded between the time associated with the previously determined position and the time of image capture by the camera. Optionally, a measure of discrepancy is based on a comparison between a PCP and a physical limit for a possible camera position responsive to a previously determined OCP, time elapsed since the previously determined OCP, and a maximum speed for the Site-Tracker onto which the camera is mounted.

Optionally, the camera position is optimized by an iterative process for approaching a minimum penalty value. Optionally, the penalty value is defined by a penalty function that combines a plurality of penalty values, each penalty value being responsive to a different measure of discrepancy calculated for a given PCP. By way example, the penalty value may be defined by a penalty function P(PCP) for a given PCP that combines multiple (I) measures of discrepancy (D) determined for the given PCP multiplied by a weight factor. Each measure of discrepancy may be denoted as $D_i(PCP)$ and each weight factor may be denoted as $w_1$ so that the penalty function is expressed as $P(PCP)=w_1 D_1(PCP)+w_2 D_2(PCP) \ldots w_I D_I(PCP)$.

By way of example, $D_1(PCP)$ is measure of discrepancy between a semantically segmented image based on a photograph from building site and a rendered image in a same format as the semantically segmented image, which is based on the PCP and a 3D representation of the building, $D_2(PCP)$ is measure of discrepancy between a boundary map of the building site and a rendered, boundary map-style image that is based on the PCP and a 3D representation of the building, $D_3(PCP)$ is measure of discrepancy between a corner map of the building site and a rendered corner map-style image that is based on the PCP and a 3D representation of the building, and $D_4(PCP)$ is measure of discrepancy the PCP and a calculated camera position based on a previously determined OCP and IMU data.

Optionally, a new iteration PCP is generated responsive to a calculated penalty value for one or more previous iterations PCP in accordance with a least square optimization algorithm such as a Gauss-Newton Algorithm or in accordance with a Bayesian algorithm. A new iteration PCP may at times be selected stochastically so that the optimization does not get unduly limited to a local minimum. Optionally, an initial OCP is first determined based on optimization the camera position defined by 2 DOF, x and y, and a final OCP is determined, starting from the initial OCP and based on optimizing z, pitch, yaw and roll.

Figure 6A:
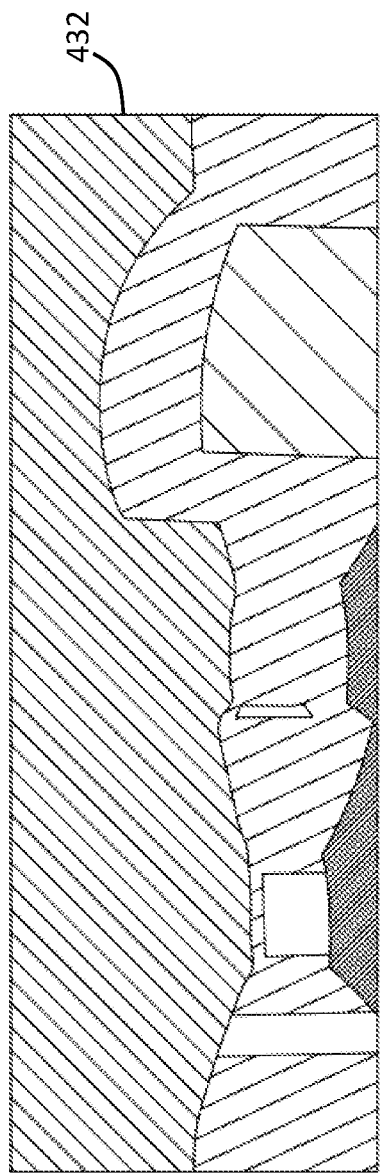
FIG. 6A schematically shows an expected image that was rendered responsive to an initially estimated camera position (prior to camera position optimization) and a 3D representation of the building, in accordance with an embodiment of the disclosure.
Figure 6B:
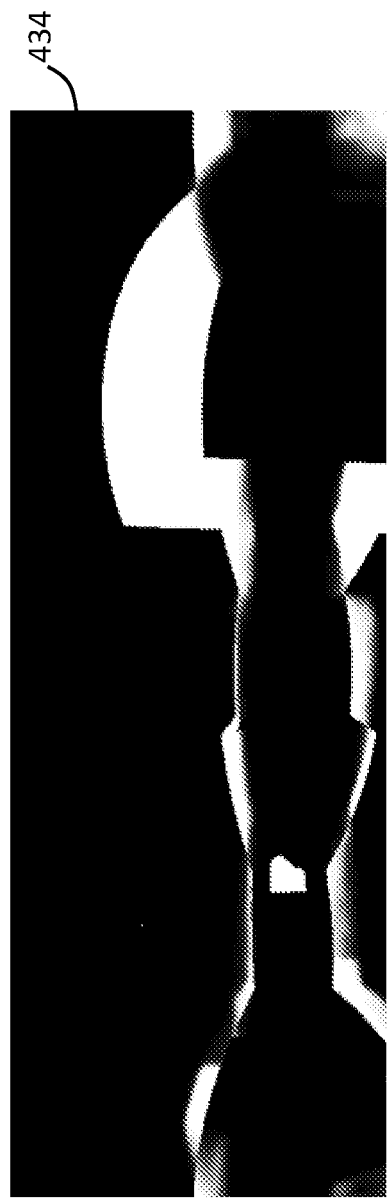
FIG. 6B schematically shows an image depicting a comparison between the semantically segmented image shown in FIG. 6A and the rendered expected site image of shown in FIG. 6A, in accordance with an embodiment of the disclosure.
Figure 7A:
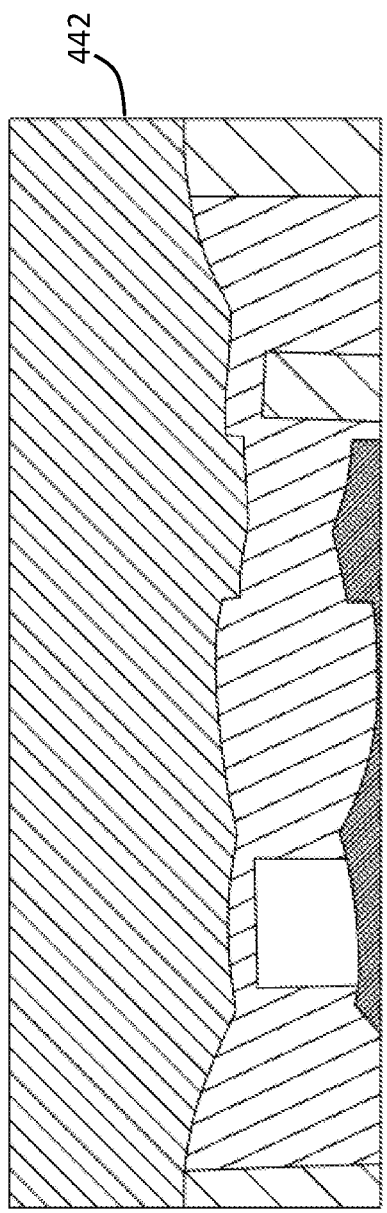
FIG. 7A schematically shows an expected site image that was rendered responsive to an optimized camera position as determined by a Locator module in accordance with an embodiment of the disclosure.
Figure 7B:
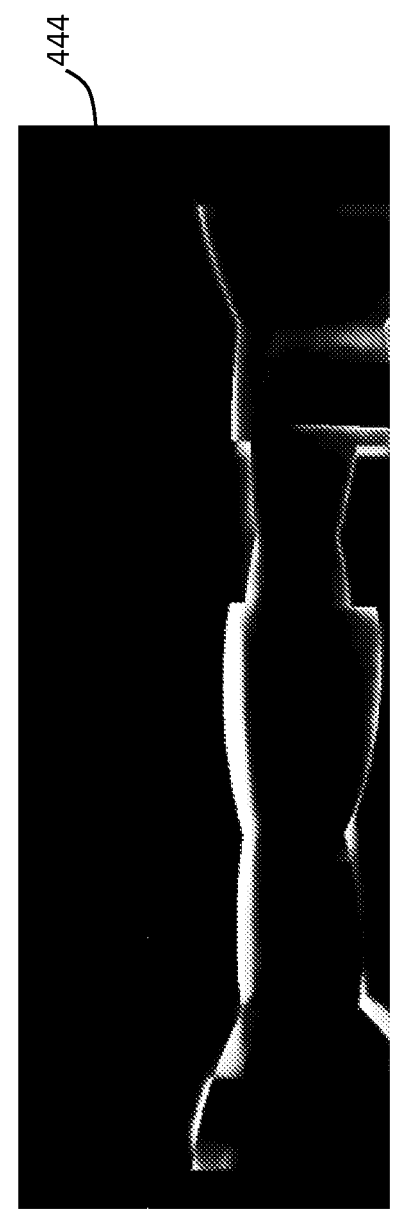
FIG. 7B schematically shows an image depicting matching regions (black) and mismatched regions (white) from a comparison between the semantically segmented image shown in FIG. 5A and the newly rendered expected image of shown in FIG. 7A, in accordance with an embodiment of the disclosure.

By way of example, FIG. 6B schematically shows a discrepancy image 434 created by calculating, for each pixel, a degree of discrepancy between semantically segmented image 424 (FIG. 5B) and expected site image 432 (FIG. 6A). A high degree of discrepancy is depicted as white and a low degree of discrepancy is depicted as black, which intermediate levels being depicted as gray. Due to poor alignment between the ICP and the actual position of the camera at the time of capturing photograph 422 (FIG. 5A), discrepancy image 434 comprises relatively many white pixels. By comparison, expected site image 442 shown in FIG. 7A, which is generated based on a 3D representation of the room and a camera position that is optimized by the Locator module is better aligned with the actual position of the camera in the room at the time of capturing photograph 422. Accordingly, discrepancy image 444 as shown in FIG. 7B, which is created by calculating a degree of discrepancy between semantically segmented image 424 (FIG. 5B) and expected site image 442 (FIG. 7A) has substantially more black pixels (indicating low discrepancy) compared to discrepancy image 434 (FIG. 6B).

A condition for optimization of the PCP to arrive at an OCP may be dependent on the penalty value passing below a threshold value. For an OCP to be accurately determined based on a comparison between a simplified site image based on a captured image and a corresponding expected site image based on an ICP (or subsequent PCP) and a 3D representation of the building, it is important that the 3D representation accurately reflect the state of the building site. In some cases, for example if the 3D representation used to generate the expected image optionally represents a partially constructed building responsive to a state of the flow model, the ability for the penalty value to get sufficiently low to reach the threshold may be dependent on the state flow model accurately representing the state of the construction process. If there is a mistake in the 3D representation or if there was a major error made in the construction process, the penalty value may not get sufficiently low at any point. As such, the Locator Module optionally generates an error message responsive to the penalty value to pass below a threshold value.

Optionally, where optimization of the camera position fails to have the penalty value pass below a threshold, the Locator module repeats the camera position optimization with an adjusted 3D representation of the building site based on changing a state of one or more CAEs in the flow model. If the change in the flow model state results in an improved penalty value that passes the threshold, the Locator Module optionally updates the flow model status to reflect the changed state of the one or more CAEs. Alternatively or additionally, the Locator Module may generate an error message to provide notification that the building process may have deviated from the flow model.

If the penalty value does not pass below the threshold even after the flow model state is adjusted, such a situation may indicate that there is a severe deviation of the construction process from the flow model, or that there was an accident where parts of the building site was damaged. As such, a Locator Module may in such a case generate an error message to provide notification that the building process may have seriously deviated from the flow model or that there was a possible accident at the building site.

A Locator process can be applied to a selection of frames of a video captured in a building site by a camera mounted on a Site-Tracker, and the selected frames may be associated with an OCP of the camera. The resulting set of OCPs may be used to create a detailed route map that is keyed to the captured video footage. It will be appreciated that, especially when a Locator process is applied to frames in a video, determination of an OCP for a given frame may be responsive to the OCP that was previously determined for temporally proximate frames.

Once an OCP is determined, it is possible to transpose a given location defined by spatial coordinates (x, y, z) within a 3D representation of a building site into one or more pixels within an image captured in the building site, provided that the given location was within the field of view of the camera at the time the image was captured. The converse is also the case, that determination of the camera position for an image captured in the building allows for transposition of one or more pixels within an image into spatial coordinates within the 3D representation of the building. Provided that the camera position and the object location are known, an angle of view of the location as captured by the camera, and a distance between the object location and the camera can be also determined based on, by way of example, trigonometric methods. The accuracy of the transposition is dependent on the accuracy of the OCP. As such, an accurately determined OCP is advantageous for providing an accurate transposition between a location within a 3D representation of a building site and one or more pixels within an image captured at the building site.

A video that is captured in a site of a building project creates numerous images of the building being constructed, including images of objects associated with CAEs comprised in a flow model associated with the building project. If a location (or an expected location) of a given object within the building is known, by way of example, as coordinates within a 3D representation of the building, and a 6 DOF camera position within the building at which a given frame of the video was captured is known, then that information can be used to select frames from the video that comprise views of the object that was captured by the camera at one or more desired angles of view and within a desired distance.

Figure 8:
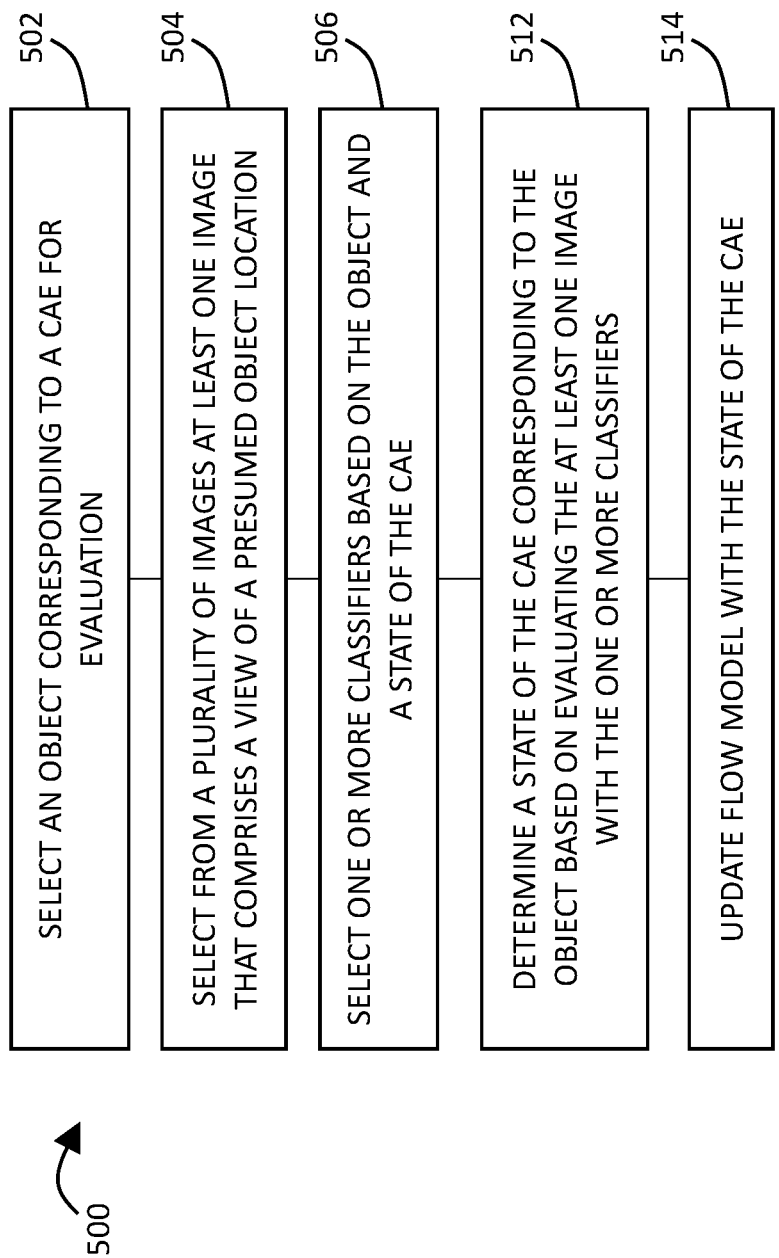
FIG. 8 shows a flow diagram describing a Binder process in accordance with an embodiment of the disclosure.

Reference is made to FIG. 8, which shows a flow diagram 500 describing a Binding method performed by Binder Module 137.

A building under construction, as well as a BIM for the building, comprises many objects. In addition, a flow model representing a building project, may comprise numerous CAEs. As such, it may be advantageous to limit evaluation by the Binder Module to a subset of objects and a subset of CAEs.

In a block 502, the Binder module selects one or more objects to be evaluated. The one or more objects may be selected responsive to a selection made by a user reviewing images captured from a building site, by way of example images stored in image database 141 and accessed by the user via computer terminal 20. The one or more objects may be selected based on a selection of a portion of a building, by way of example a room or a floor that is currently under construction, optionally as selected by a user. The one or more objects may be selected based on a state of the flow model representing the status of the building, where CAEs respectively representing the one or more objects as currently being under construction. Optionally, the one or more objects are selected based on a respective corresponding CAE being, according to the flow model comprising the CAE, in a ready state or an intermediate state (as opposed to a non-ready state or a completed state), by way of example as described herein with respect to flow model 200. The one or more objects may be selected based on a comparison between a flow model state and a construction schedule, so that objects that are determined to have progressed to a new CAE state (an "expected state") according to the construction schedule in comparison to the current state as represented in the flow model are selected for evaluation.

Figure 9:
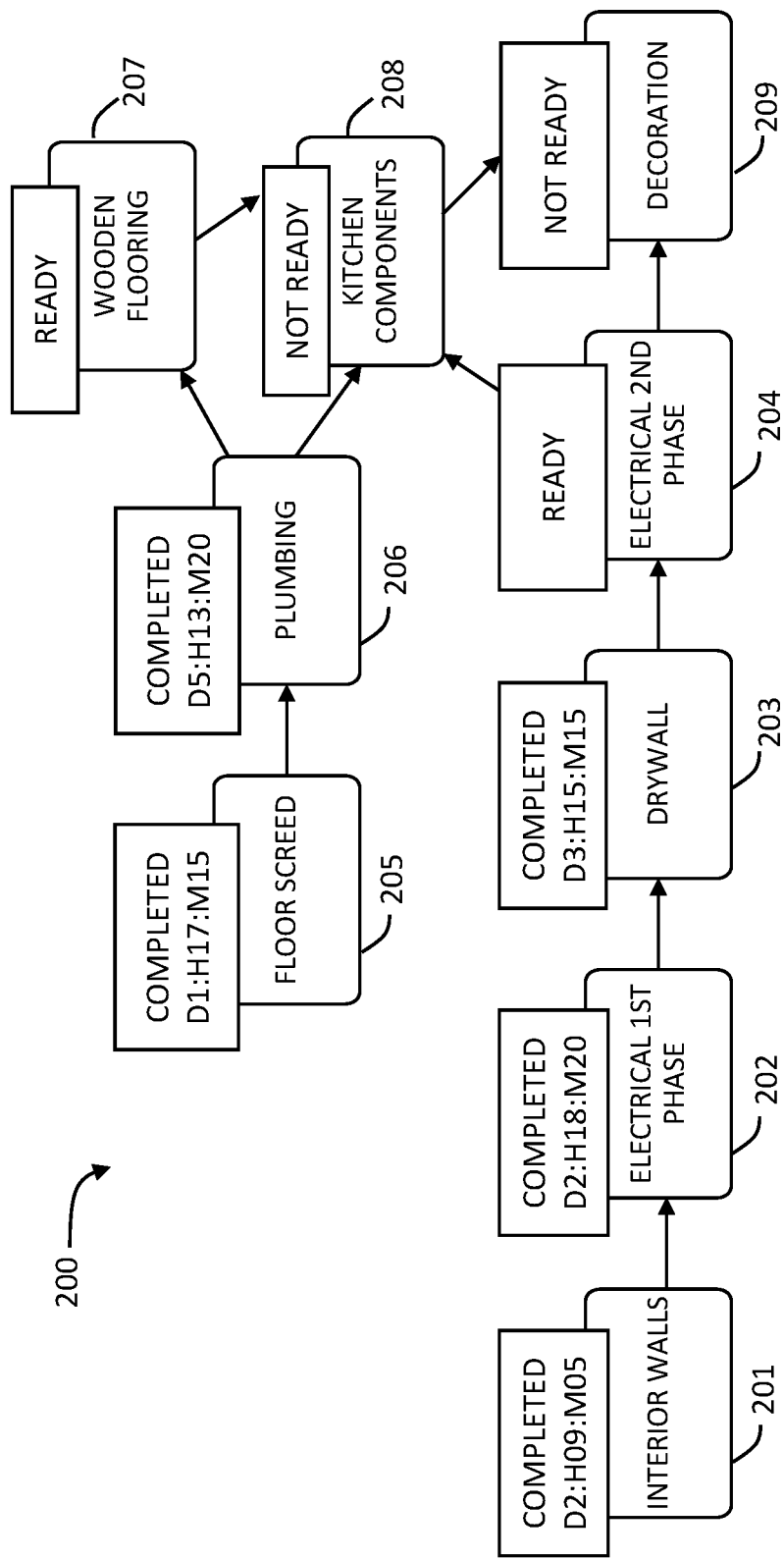
FIG. 9 schematically shows a flow model comprising timestamped CAEs, as updated by a Binder process in accordance with an embodiment of the disclosure.

Reference is made to FIG. 9, which schematically shows a portion of flow model 200 (also shown in FIG. 2A). As shown in FIG. 9, each CAE is also shown with an accompanying "status display" box indicating its status of not ready, ready or completed, which further includes a timestamp for those CAEs that have achieved a completed state. By way of example, floor screed CAE 205 is indicated as having achieved a completed state at a time of 17:55 on day 1, and plumbing CAE 206 is indicated as having achieved a completed state at a time of 9:20 on day 2. Once plumbing CAE 206 is updated to achieve a completed state, wooden flooring CAE is 207, for which plumbing CAE 206 is the sole predecessor CAE, enters into a ready state. However, kitchen component CAE 208 remains at a non-ready state because, while a first predecessor CAE, plumbing CAE 206 has achieved a completed state, a second predecessor CAE, wooden flooring CAE 207, has not.

Figure 10:
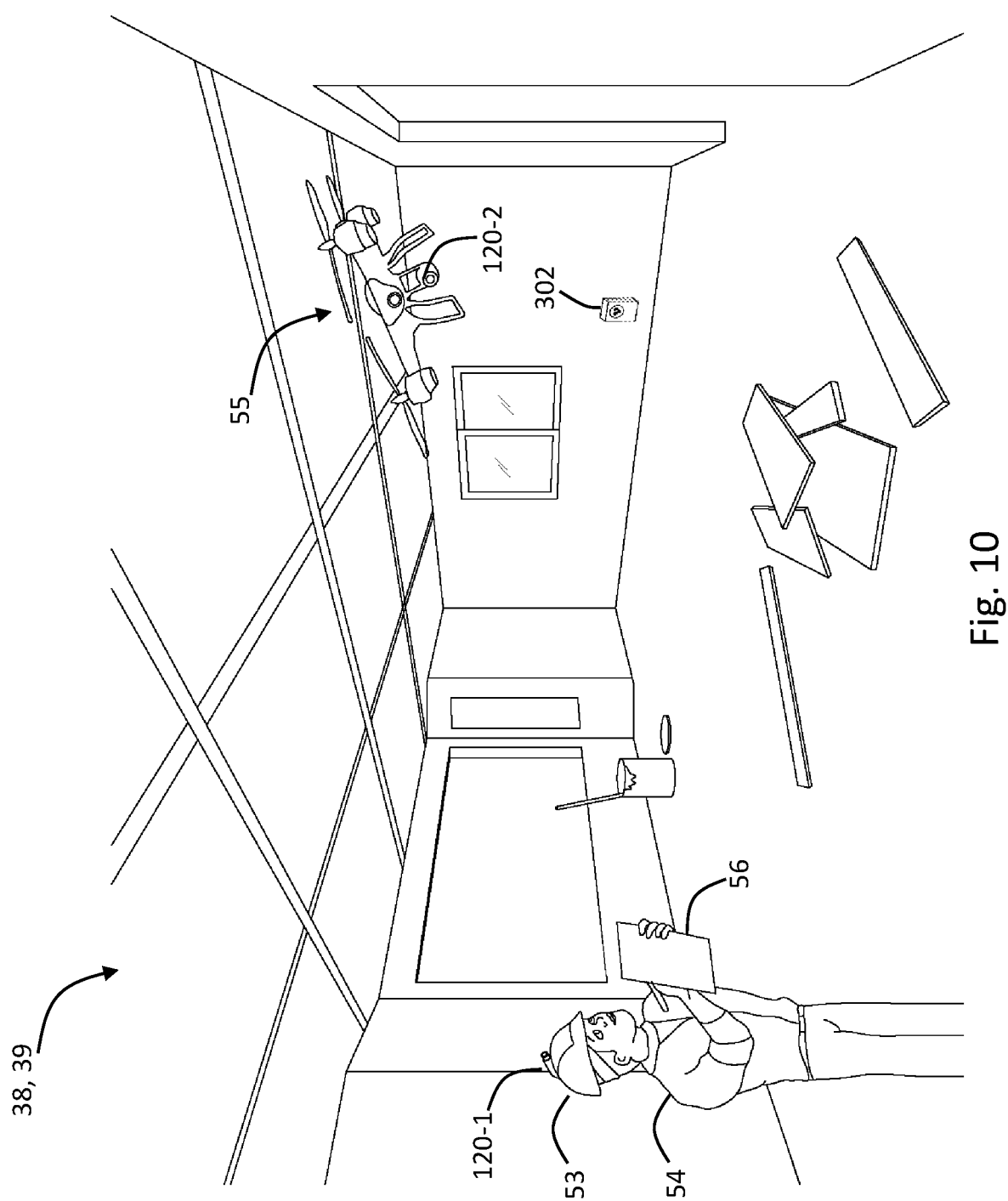
FIG. 10 schematically shows a room in a building being monitored by Site-Trackers and evaluated with a Binder module in accordance with an embodiment of the disclosure.

Reference is made to FIG. 10, which shows room 39 as shown in FIG. 1B and whose state is represented by flow model 200, but at a later timepoint when electric outlet 302 corresponding to CAE 204 has been successfully installed. The state of flow model 200 as shown in FIGS. 2A and 9 is such that the CAE of electrical second phase 204, corresponding to an electric outlet, has a "ready" state. However, a construction schedule (not shown) indicates that the state of CAE 204 should have progressed to a "completed" state (See FIG. 2A, reference numeral 215). The Binder Module may process the flow model and the construction schedule to determine that CAE 204 now has an expected state of a "completed" state rather than the "ready state" as currently represented in flow model, and select electric outlet 302 for evaluation.

In a block 504, for each object of the one or more objects, the Binder module selects from a plurality of images at least one image that comprises a view of the object based on a presumed location of the object. The presumed location may be based on a model comprising sufficient information to generate a 3D representation of the building site that comprises a representation of the object. The 3D representation may be based on a BIM and/or a Gantt chart of the building. The presumed location of the object may be based on a prior determination of the object location performed manually, optionally through visual detection from an image by a user, or by a Locator Module in accordance with an embodiment of the disclosure.

The plurality of images from which the images for evaluation are selected may comprise frames of a video footage captured in the building, optionally by a Site-Tracker in accordance with an embodiment of the disclosure, and optionally stored in image database 141. The plurality of images may be timestamped, and the at least one image may be selected based on time of capture, as compared to a timestamp for a state change of the corresponding CAE. Optionally, the selection of a given image comprises transposing the presumed object location to select a region of interest (ROI) within the image that includes the view of the object for further processing. The images may be selected responsive to their timestamp as well, so that the selected images are captured during the time window when the CAE is scheduled to be in the expected state. By way of example, with reference to FIG. 9, in a case where CAE 204 according to flow model 200 has a current state of "ready", and a construction schedule indicates that the CAE state should have progressed to a "completed" state as of two days ago, then the Binder Model may select images that were capture within the past two days.

Optionally, the at least one image and/or ROI within the image is selected to be within one or more image parameters, such as an angle of view, a distance between the object and the camera that captured the image, a level of contrast, and focus, be within a preferred range, respectively. Other image parameters may include presence of other objects blocking the object, and a geometric shape of the object as imaged. By way of example, an image capture within the desired timeframe and angle of view may nevertheless not be selected if the portion of the image having a view of the object is out of focus.

Figure 11C:
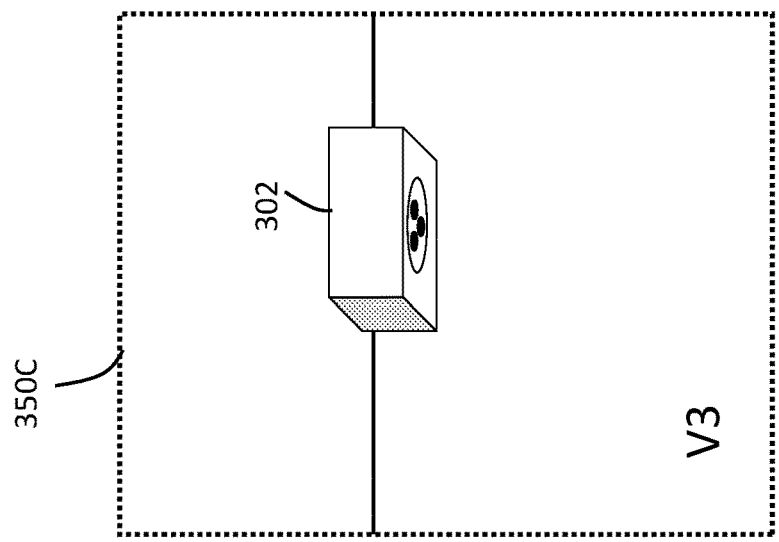
FIGS. 11A-11C schematically shows multiple views of an object in a room being evaluated with a Binder module in accordance with an embodiment of the disclosure.
Figure 11B:
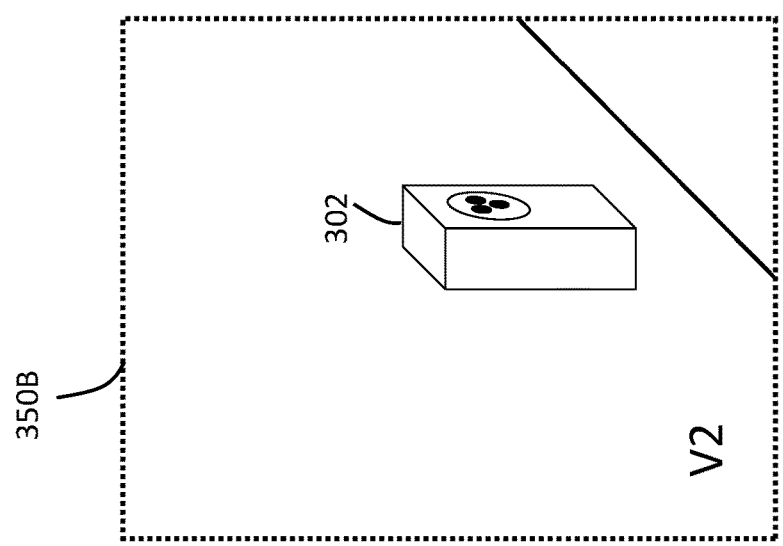
Figure 11A:
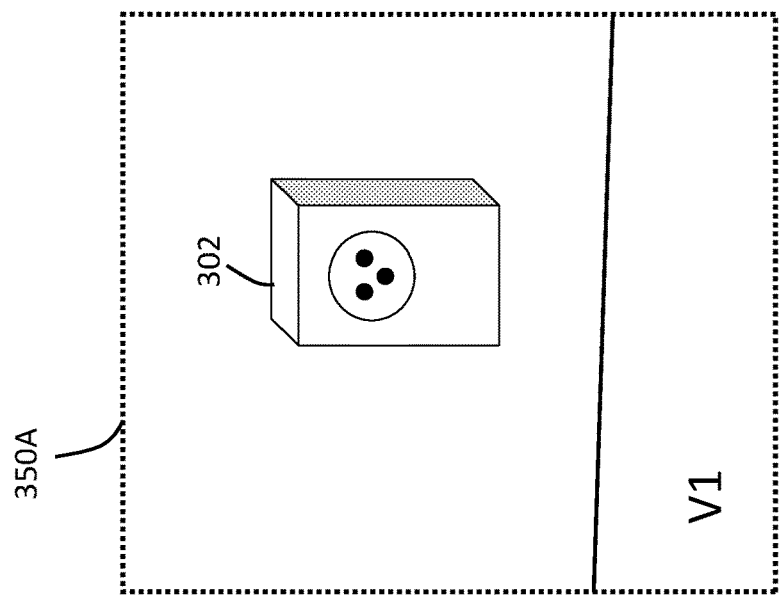

By way of example and with reference to FIG. 10, the Binder Model selects ROIs, respectively, from a plurality of stills of a video captured by Site-Tracker 120-2 that includes appropriate views of electrical outlet 302. Three of the selected ROIs are schematically shown respectively as ROI 350A in FIG. 11A that includes a first view (V1) of electrical outlet 302, ROI 350B in FIG. 11B that includes a second view (V2) of electrical outlet 302, and ROI 350C in FIG. 11C that includes a third view (V3) of electrical outlet 302.

In a block 506, for each object being evaluated, the Binder Module selects one or more classifiers based on the object and an expected construction state of the corresponding CAE. Optionally, BuildMonitor 130 comprises a classifier database 142 storing a plurality of classifiers (which may be referred to herein as a "classifier pool"). A classifier comprised in classifier database 142 may be designated to evaluate images comprising of views of a given object to classify a state of a given CAE associated with the given object. Optionally, the classifier is a classifier designated evaluate and classify the at least one image as indicating the CAE to be in one of a plurality of possible states, or to provide respective likelihoods of the CAE to be in two or more of a plurality of possible states. Optionally, the classifier is a binary classifier providing a yes/no output regarding one or more CAE state. The classifiers stored in classifier database 142 may be generated through a machine learning process that trains classifiers using reference images of an object designated as indicating a particular state of a CAE.

By way of example, if a state of flow model 200 as shown in FIG. 2A is such that the CAE of electrical second phase 204 has a state of ready state 212, and an object associated with CAE 204 is an electrical outlet, then the Binder Module may select a first classifier that is designated to evaluate the one or more images of electrical outlet 302 and determine whether or not CAE 204 is in ready state 212, a second classifier that is designated to determine whether or not CAE 204 is in $1^{st}$ intermediate state 213, a third classifier that is designated to determine whether or not CAE 204 is in $2^{nd}$ intermediate state 214, and a fourth classifier that is designated to determine whether or not CAE 204 is in completed state 215. By way of another example, the Binder Module selects one classifier that is designated to evaluate the one or more images of the electrical outlet and determine the likelihood, respectively, of CAE 204 being in ready state 212, in $1^{st}$ intermediate state 213, $2^{nd}$ intermediate state 214, and completed state 215.

A classifier designated to evaluate a given object may have a preferred number of views of the object for evaluation, each view optionally characterized by a preferred angle of view and optionally a preferred distance from the camera. A classifier may have other preferred parameters, such as level of lighting, contrast, and focus. The Binder module may select images based of the preferred parameters for the classifiers available for evaluating a given state of a given object. Conversely, the Binder Module may select an appropriate classifier based on the image parameters of the available images. By way of example, within the classifier pool may be stored two different classifiers that are both appropriate for processing selected images to evaluate whether or not CAE 204 is in complete state 215, where one classifier is more appropriate for evaluating images captured in well-lit conditions, and the other classifier is more appropriate for evaluating images captured in low-light conditions.

In a block 512, the Binder Module determines a construction state of the CAE corresponding to the object based on evaluating the at least one image with the one or more classifiers.

In a block 514, the Binder Module optionally updates a state of the flow model for the building to indicate the construction state of the CAE as determined in block 512.

In an embodiment, updating a state of the flow model comprises timestamping a change in a construction state of a CAE. Timestamping CAE state changes advantageously allows a flow model to not only provide a plan of future construction actions to be taken, but also a record of progress achieved for the building project represented by the flow model. The timestamp of the CAE state change may be based on a timestamp of the images evaluated by the classifiers in block 512. By way of example, the Binder module, when updating CAE 204 to having a completed state, also timestamps the CAE with the time of completion, which may be the time of capture for the video stills from which ROIs 350A-350C were selected. A CAE, a construction status, or a timestamp may further be associated with an image captured at the building site to provide visual evidence for changes in construction state. By way of example, a copy of one or more of ROIs 350A-350C selected at block 506 that was used to update CAE 204 to the completed state may be saved along with the timestamp as a part of updated flow model 200.

A CAE, a construction status or a timestamp may further be associated with an identity of the contractor that performed the CAE to provide a record of performance for the contractor.

Optionally, a Site-Tracker monitoring progress of a building under construction is controlled responsive to a state of a flow model for the building so that a video captured by the Site-Tracker comprises frames that are optimal for evaluating the state of the flow model. A route taken by a Site-Tracker in a building site may be determined based on: registering CAEs that are in a ready state, registering a presumed location of an object associated with the CAE, and adjusting the route so that one or more images of the presumed object location will be captured. By ways of example, in a case where electrical $2^{nd}$ phase CAE 204 is in a ready state, then a processor comprised in the Site-Tracker registers a presumed location of power outlets that are to be built during CAE 204, and those locations are made to be included in the monitoring route for the Site-Tracker. The route may be determined responsive to a comparison between a flow model state and a construction schedule, so that a CAE that has a state as represented in the schedule be further progressed compared to the CAE state as represented in the flow model is selected for being imaged by the Site-Tracker.

Optionally, whether or not to adjust a monitoring route based on the presumed object location is responsive to a "time" cost for collecting this information based on, by way of example, how far the Site-Tracker needs to travel from its' planned path to add this information. By way of example, if the particular Site-Tracker was scheduled to monitor a different section of the building, then the planned route of the Site-Tracker may not be adjusted. Optionally, whether or not to adjust a monitoring route based on the presumed object location is responsive to a measure criticality of the CAE status. The measure of criticality is based on, by way of example, the dependence of other CAEs on determining the status of this particular CAE, or the duration of time passed since objects associated with the CAE were last imaged.

The timestamps created by the Binder Module may be used to make predictions about future progress of a building project.

In an embodiment, Predictor Module 138 operates to predict aspects of future progress of a flow model. Predictions made for a given flow model may be based on evaluation of timestamps previously assigned to predecessor CAE of the flow model and/or based on other flow models representing other building projects.

In an embodiment the Predictor Module generates a timetable of expected times for state changes of CAEs to occur, or expected time durations between a pair of states, such as between a beginning of a CAE entering a ready state and the CAE achieving a completed state. An example timetable is provided herein below at Table 2:

timestamp for achievement of completed state. The time stamp for the ready state corresponds with the timestamp for achievement of the completed state for its predecessor CAE. As such, by way of example, the timestamp for the start of ready state for CAE 202 is the same as the timestamp for achievement of completed state for predecessor CAE 201. The timetable also includes an expected duration for each CAE.

Predictor Module 138 may determine an actual CAE duration for a CAE based on the difference in time between a start time for a ready state of the CAE and the time of achievement of the completed state, as determined by timestamps optionally provided by the Binder Module.

Predictor Module 138 may detect a delay, in the building project based on cletemining a date of expected completion of a CAE based on a start time for a ready state of the CAE and an expected duration [YS4][KHS] of the CAE, and if the CAE does not progress to a completed state, optionally as determined by Binder Module 137, the CAE is designated as being delayed. By way of example, as shown in Table 2, Plumbing CAE 206 entered its ready state in the evening of day 1. The CAE's expected duration is 2 days. Therefore, because CAE 206 did not proceed to a completed stated during day 3, the Predictor Module designated the CAE as being delayed. In addition, CAE 204 entered its ready state in the afternoon of day 3 and has an expected duration of 1 day. However, even as of day 5, the CAE has not progressed to a completed state, and was designated as delayed at the end of day 4. The Predictor module, upon detection of the delay, may generate a delay warning message indicating the delay.

The expected duration may be provided as an estimate by the contractor that is assigned to perform the CAE. The expected duration may be generated by the Predictor Module based on a record of performance duration of other equivalent CAEs already completed in other parts of house 38, and/or completed in other buildings, optionally further based on the assigned contractor. By way of example, the Predictor Module may process one or more timestamped flow models to acquire CAE durations, from initiation of a ready state to reaching a completed state, from a selection of a same CAE or similar CAEs. The selection may be limited

TABLE 2

| CAE ID | CAE Name | READY STATE | COMPLTED STATE | CAE DURATION: EXPECTED | CURRENT TIME: D5:H14:M05 DELAY? |
|---|---|---|---|---|---|
| 201 | INTERIOR WALLS | D1:H00:H00 | D2:H09:M05 | 2 days | N |
| 202 | ELECTRICAL 1ST PHASE | D2:H09:M05 | D2:H18:M20 | 1 day | N |
| 203 | DRYWALL | D2:H18:M20 | D3:H15:M15 | 1 day | N |
| 204 | ELECTRICAL 2ND PHASE | D3:H15:M15 | N/A | 1 day | Y |
| 205 | FLOOR SCREED | D1:H00:H00 | D1:H17:M15 | 2 days | N |
| 206 | PLUMBING | D1:H17:M15 | D5:H13:M20 | 2 days | Y |
| 207 | WOODEN FLOORING | D5:H13:M20 | N/A | 1 day | N |
| 208 | KITCHEN COMPONENTS | N/A | N/A | 1 day | N/A |
| 209 | DECORATION | N/A | N/A | 1 day | N/A |

Table 2 shows a timetable for a selection of the CAEs of flow model 200, as shown in FIG. 9. The table shows, for each CAE, a timestamp for start of ready state and a to CAE performed by a same contractor and/or CAEs previously completed part of a same building project and modeled as part of a same flow model.

The ready state and complete state timestamps of CAEs as shown in Table 2 describes durations of individual CAEs in one subsection of a building project, by way of example kitchen 39 in house 38. To generate the expected duration of 2 days for floor screed CAE 205, the Predictor module may access timestamped flow models of completed buildings stored in flow model DB 133 to acquire the duration of other instances of floor screed CAEs performed by the same contractor. The Predictor Module may, based on the acquired durations of the other floor screed CAE's determined that floor screed CAE 206 is expected to have a duration of 2 days. By way of example, the expected duration may be a weighted average of the previously completed floor screed CAEs, adjusted for the area of floor space.

The Predictor module may update its calculation of expected CAE duration dynamically. By way of example office tower 32 as shown in FIG. 1A, may comprise many rooms that are identical or near identical, with an identical or near identical flow model describing the construction process for each of the rooms. An initial estimated CAE duration may be provided by the contractors. However, as some of the rooms are built, the Predictor model may collect CAE durations and calculate a new expected CAE duration based on the collected CAE durations, optionally based on average duration for a same CAE class. By way of example, the floor screed CAE for a set of identical rooms in office tower 32 in floors 2-40 may initially be set as 2 days. However, once the rooms in floors 2-5 are complete, the Predictor module may detect that the floor screed CAE took on average 3.5 days to complete, rather than the initially expected 2 days. The predictor module may then update future floor screed CAEs to have an expected duration of 3.5 days rather than 2. In addition, the Predictor module, upon detection of the discrepancy between the initially estimated and the updated CAE duration, may produce an alert or a warning that may be displayed to a user of the Buildmonitor system, by way of example through a graphical user interface shown in terminal 20.

Optionally, the Predictor Module operates to dynamically update an expected duration for a CAE based on information received from external sources, including information relating to weather conditions, availability of building supplies, availability of contractors, building management decisions and/or priorities, and the like. Changes in the expected duration may generate an alert, by way of example a delay alert.

Predictor Module 138 may determine an expected duration for a building project or a potion thereof based on a sum of the expected duration for all CAEs comprised in a flow model or a portion thereof for the building project.

The Predictor Module may also monitor what resources will be needed based on upcoming CAE. Optionally, each CAE is associated with objects, tools, and type of contractors needed to perform the associated construction actions, and the Predictor module determined a schedule of resources needed responsive to state of the one or more flow models respectively representing one or more ongoing building projects. The Predictor Module may generate a warning message upon detecting that the scheduled resources needed exceeds a measure of available resources.

Descriptions of embodiments are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

In an embodiment, Presenter Module 139 operates to display results of evaluations performed by the other modules comprised in BuildMonitor 100, including one or more of FBM 135, Locator Module 136, Binder Module 137, and Predictor Module 138. FIG. 12 shows an example Project Overview 600 created by the Presenter Module for a multi-unit residential building with five apartments. Project Overview 600 displays a window 602 showing a project start date, an expected delivery date, and an original delivery date. Project Overview 600 also displays a window 604 comprising a progress chart for various portions of the building project, including a lobby, basement and apartments 1-5. Each column may correspond to a CAE, and shows a status for the respective CAE of completed, ready, and not ready. The status of the respective CAEs may be regularly updated based on updating a flow model of the building, optionally by Binder Module 137. In cases where a delay is detected by the Binder Module and/or the Predictor Module, the delay is indicated as well. Project Overview 600 also displays a window 606 comprising actionable insights based on the data gathered and evaluated by aspects BuildMonitor 100. By way of example, window 606 indicates that "Brick-laying is the most common reason for delays in the project". This insight is also reflected in the delays indicated in the chart shown in window 604. Window 606 also indicates that "The projected delivery date is 30 Nov. 2019, which is 97 days past original schedule", which is also reflected on the dates shown in window 602.

There is therefore provided in accordance with an embodiment of the disclosure a locator method performed by a computer for determining a position of an image capture device (ICD) within a building site, the method comprising: receiving an image captured in the building site by the ICD; receiving an initial ICD position of the ICD at the time the image was captured; generating a plurality of proposed ICD positions based on the initial ICD position; and determining an optimized ICD position from the plurality of proposed ICD positions.

In an embodiment of the disclosure, the optimized ICD position is determined responsive to a model of the building site that comprises sufficient information to generate a three dimensional (3D) representation of the building site. Optionally, the optimized ICD position is selected responsive to reducing a measure of discrepancy between at least one simplified site image based on the captured image and a corresponding expected site image based on a proposed ICD position from the plurality of proposed ICD positions and the model of the building site. Optionally, the expected site image comprises a computer-rendered image of the building site as would be captured by a virtual camera having a location and an orientation within the 3D representation based on the proposed ICD position. Optionally, each pixel of the at least one simplified site image is assigned one out of a plurality of predefined categories, and each pixel of the corresponding expected site image is assigned with a category selected from the same plurality of predefined categories. Optionally, the at least one simplified site image is generated from the captured image based on evaluation of the captured image with a neural network. Optionally, the at least one simplified site image comprises one or more of: a corner map, a depth map, a boundary map, or a semantically segmented image. Optionally, the 3D representation used to generate the expected site image represents a partially constructed building based on a presumed level of progress the building project.

In an embodiment of the disclosure, the optimized ICD position is selected responsive to reducing a measure of discrepancy between a proposed ICD position and a calculated ICD position based on one or more of: a previously determined ICD position and inertial measurement data responsive to movement of the ICD. Optionally, the previously determined ICD position is a chronologically earlier position of the ICD or a chronologically later position of the ICD. Optionally, the measure of discrepancy is based on the proposed ICD position not exceeding a physical limit for a possible ICD position, the physical limited being based on the previously determined ICD position, a time elapsed between the initial ICD position the previously determined ICD position, and a maximum speed for a vehicle onto which the ICD was mounted.

There is also provided in accordance with an embodiment of the disclosure a Locator Module for determining a position of an image capture device (ICD) within a building site, the module comprising a processor that operates, based on executing a set of instruction stored in a memory to perform an embodiment of the locator method.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the invention is limited only by the claims.

The invention claimed is:

1. A locator module for determining a position of an image capture device (ICD) within a building site, the module comprising:
   a processor that operates, based on executing a set of instruction stored in a memory to:
      receive an image captured in the building site by the ICD;
      receive an initial ICD position of the ICD at the time the image was captured;
      generate a plurality of proposed ICD positions based on the initial ICD position;
      generate at least one simplified site image based on the captured image, by assigning to each pixel of the captured image one of a plurality of predefined categories, by:
         characterizing each pixel of the captured image with a likelihood value for each of the plurality of predefined categories, respectively, and
         assigning to said each pixel of the captured image a category with a highest likelihood value;
      generate a plurality of expected site images by generating a respective expected site image for each one of the plurality of proposed ICD positions, each generated expected site image is a three dimensional (3D) representation of the building site as would have been captured by the ICD from the respective proposed ICD position, based on a model of the building site and a state of a progress of a building project of said building site and a presumed level of progress of the building project according to a state of a flow model associated with the building project at the time the image was captured;
      for each pixel of each of the plurality of expected site images, assign one of said plurality of predefined categories, by:
         characterizing each pixel of each of the plurality of expected site images with a likelihood value for each of the plurality of predefined categories, respectively, and
         assigning to said each pixel of each of the plurality of expected site images a category with a highest likelihood value;
      for each one of the plurality of expected site images:
         evaluate, separately, for each one of the plurality of predefined categories a discrepancy according to a discrepancy between categories assigned to each pixel in a pair of a pixel of the simplified site image and a corresponding pixel in a respective expected site image, to compute a plurality of categories discrepancies; and
         combine the computed plurality of categories discrepancies to a combined measure of discrepancy; and
      determine an optimized ICD position by selecting from the plurality of proposed ICD positions, a proposed ICD position with the most reduced combined measure of discrepancy.

2. The locator module according to claim 1, wherein the expected site image comprises a computer-rendered image of the building site as would be captured by a virtual camera having a location and an orientation within the 3D representation based on the proposed ICD position.

3. The locator module according to claim 1, wherein the at least one simplified site image is generated from the captured image based on evaluation of the captured image with a neural network.

4. The locator module according to claim 3, wherein the at least one simplified site image comprises one or more of: a corner map, a depth map, a boundary map, or a semantically segmented image.

5. The locator module according to claim 1, wherein the optimized ICD position is selected responsive to reducing a measure of discrepancy between a proposed ICD position of the plurality of proposed ICD positions and a calculated ICD position based on one or more of: a previously determined ICD position and inertial measurement data responsive to movement of the ICD.

6. The locator module according to claim 5, wherein the previously determined ICD position is a chronologically earlier position of the ICD.

7. The locator module according to claim 5, wherein the previously determined ICD position is a position of the ICD in a chronologically later time than a position of the ICD when said image was captured.

8. The locator module according to claim 5, wherein the measure of discrepancy is based on the proposed ICD position not exceeding a physical limit for a possible ICD position, the physical limit being based on the previously determined ICD position, a time elapsed between the initial ICD position the previously determined ICD position, and a maximum speed for a vehicle onto which the ICD was mounted.

9. A method performed by a computer for determining a position of an image capture device (ICD) within a building site, the method comprising:
  receiving an image captured in the building site by the ICD;
  receiving an initial ICD position of the ICD at the time the image was captured;
  generating a plurality of proposed ICD positions based on the initial ICD position;
  generating at least one simplified site image based on the captured image, by assigning to each pixel of the captured image one of a plurality of predefined categories, by:
    characterizing each pixel of the captured image with a likelihood value for each of the plurality of predefined categories, respectively, and
    assigning to said each pixel of the captured image a category with a highest likelihood value;
  generating a plurality of expected site images by generating a respective expected site image for each one of the plurality of proposed ICD positions, each generated expected site image is a three dimensional (3D) representation of the building site as would have been captured by the ICD from the respective proposed ICD position, based on a model of the building site and a state of a progress of a building project of said building site and a presumed level of progress of the building project according to a state of a flow model associated with the building project at the time the image was captured;
    for each pixel of each of the plurality of expected site images, assigning one of said plurality of predefined categories, by:
      characterizing each pixel of each of the plurality of expected site images with a likelihood value for each of the plurality of predefined categories, respectively, and
  assigning to said each pixel of each of the plurality of expected site images a category with a highest likelihood value;
  for each one of the plurality of expected site images:
    evaluating, separately, for each one of the plurality of predefined categories a discrepancy according to a discrepancy between categories assigned to each pixel in a pair of a pixel of the simplified site image and a corresponding pixel in a respective expected site image, to compute a plurality of categories discrepancies; and
    combining the computed plurality of categories discrepancies to a combined measure of discrepancy; and
  determining an optimized ICD position by selecting from the plurality of proposed ICD positions, a proposed ICD position with the most reduced combined measure of discrepancy.

10. The method according to claim 9, wherein the expected site image comprises a computer-rendered image of the building site as would be captured by a virtual camera having a location and an orientation within the 3D representation based on the proposed ICD position.

11. The method according to claim 9, wherein:
  each pixel of the at least one simplified site image is assigned one out of a plurality of predefined categories; and
  each pixel of the corresponding expected site image is assigned with a category selected from the same plurality of predefined categories.

12. The method according to claim 11, wherein the at least one simplified site image is generated from the captured image based on evaluation of the captured image with a neural network.

13. The method according to claim 12, wherein the at least one simplified site image comprises one or more of: a corner map, a depth map, a boundary map, or a semantically segmented image.

14. The method according to claim 9, wherein the optimized ICD position is selected responsive to reducing a measure of discrepancy between a proposed ICD position of the plurality of proposed ICD positions and a calculated ICD position based on one or more of: a previously determined ICD position and inertial measurement data responsive to movement of the ICD.

15. The method according to claim 14, wherein the previously determined ICD position is a chronologically earlier position of the ICD.

16. The method according to claim 14, wherein the previously determined ICD position is a position of the ICD in a chronologically later time than a position of the ICD when said image was captured.

17. The method according to claim 14, wherein the measure of discrepancy is based on the proposed ICD position not exceeding a physical limit for a possible ICD position, the physical limited being based on the previously determined ICD position, a time elapsed between the initial ICD position the previously determined ICD position, and a maximum speed for a vehicle onto which the ICD was mounted.

* * * * *